United States Patent
Sekiya et al.

(10) Patent No.: US 8,848,176 B2
(45) Date of Patent: Sep. 30, 2014

(54) DISPERSION MEASUREMENT APPARATUS USING A WAVELET TRANSFORM TO DETERMINE A TIME DIFFERENCE BASED ON INDENTIFIED PEAKS

(75) Inventors: Motoyoshi Sekiya, Kawasaki (JP); Yusaku Yamamoto, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 154 days.

(21) Appl. No.: 13/207,796

(22) Filed: Aug. 11, 2011

(65) Prior Publication Data

US 2012/0045160 A1    Feb. 23, 2012

(30) Foreign Application Priority Data

Aug. 20, 2010    (JP) .................................. 2010-185149

(51) Int. Cl.
*G01N 21/00*    (2006.01)
*H04B 10/077*    (2013.01)
(52) U.S. Cl.
CPC .................................. *H04B 10/0775* (2013.01)
USPC .......................................... 356/73.1; 398/29
(58) Field of Classification Search
CPC ..................... H04B 10/25137; H04B 10/0775; G01M 11/3163; G01M 11/338
USPC ............................ 356/73.1, 450–521; 398/29
See application file for complete search history.

(56) References Cited

U.S. PATENT DOCUMENTS

| | | | |
|---|---|---|---|
| 2001/0003527 A1* | 6/2001 | Shinohara et al. | 370/521 |
| 2006/0018586 A1* | 1/2006 | Kishida | 385/12 |
| 2006/0038705 A1* | 2/2006 | Brady et al. | 341/13 |
| 2006/0188267 A1* | 8/2006 | Gavrilovic et al. | 398/188 |
| 2007/0171402 A1* | 7/2007 | Watley et al. | 356/73.1 |
| 2009/0067286 A1* | 3/2009 | Bose et al. | 367/38 |
| 2012/0201096 A1* | 8/2012 | Valero et al. | 367/81 |

FOREIGN PATENT DOCUMENTS

| | | |
|---|---|---|
| JP | 2000-121500 | 4/2000 |
| JP | 2001-281103 | 10/2001 |
| JP | 2003-98037 A | 4/2003 |
| JP | 2008-64683 A | 3/2008 |
| WO | 2004/040241 | 5/2004 |

OTHER PUBLICATIONS

English-language partial translation of Office Action (hereinabove "JPOA") mailed by Japan Patent Office on Jan. 7, 2014, in connection with foreign priority Japanese Patent Application No. 2010-185149.
JPOA—Office Action of Japanese Patent Application No. 2010-185149 dated Aug. 5, 2014 with Partial Translation.

* cited by examiner

*Primary Examiner* — Tarifur Chowdhury
*Assistant Examiner* — Michael P Lapage
(74) *Attorney, Agent, or Firm* — Fujitsu Patent Center

(57) ABSTRACT

A dispersion measurement apparatus includes: a pulse generator to output optical pulses including an optical pulse with a first wavelength and an optical pulse with a second wavelength to an optical transmission path, the second wavelength being different from the first wavelength; a reception pulse analyzer including an optical receiver that receives the optical pulses output by the pulse generator, and an analyzer that performs a wavelet transform on an electrical pulse output through the reception performed by the optical receiver; and a calculator to detect, based on a result of the wavelet transform, a time difference between the optical pulse with the first wavelength and the optical pulse with the second wavelength, and to determine dispersion in the optical transmission path.

6 Claims, 16 Drawing Sheets

DISPERSION MEASUREMENT APPARATUS USING A WAVELET TRANSFORM TO DETERMINE A TIME DIFFERENCE BASED ON INDENTIFIED PEAKS

CROSS-REFERENCE TO RELATED APPLICATION

This application is based upon and claims the benefit of priority of the prior Japanese Patent Application No. 2010-185149 filed on Aug. 20, 2010, the entire contents of which are incorporated herein by reference.

FIELD

The embodiment discussed herein is related to an apparatus for measuring dispersion in an optical transmission path.

BACKGROUND

In optical transmission systems, knowing dispersion in optical transmission paths serving as optical-signal transmission media is useful and/or necessary for operation of the systems. The dispersion is caused by variations in a group velocity which depend on wavelength components of transmission wavelengths, when signal light is transmitted through an optical transmission path. The dispersion causes waveform degradation at the receiving end. One example of an available method for measuring dispersion in an optical-fiber transmission path is a method in which two optical pulses with different wavelengths are simultaneously launched into an optical fiber and the propagation time of the optical pulses that have passed through the optical fiber transmission path are measured.

Dispersion DL in an optical fiber for a wavelength $\lambda_1$ and a wavelength $\lambda_2$ is determined from the wavelengths of optical pulses propagating in the optical fiber and the propagation time thereof, in accordance with:

$$DL = \frac{\Delta t_1 - \Delta t_0}{\lambda_2 - \lambda_1} \quad (1)$$

where $\Delta t_0$ denotes a time difference between two optical pulses at the transmitting end and $\Delta t_1$ denotes a time difference between the two optical pulses at the receiving end.

FIG. 1 illustrates an example of dispersion measurement. In the example of FIG. 1, the transmitting end launches optical pulses (e.g., rectangular waves) with wavelengths $\lambda_1$ and $\lambda_2$ and with a pulse width w into an optical fiber at the same time ($\Delta t_0=0$) and the receiving end receives the optical pulses through the optical-fiber transmission path. In this case, letting $\Delta t_1$ be the time difference between the two optical pulses at the receiving end, the dispersion in the optical fiber is given by equation (1) noted above.

Examples of related art include Japanese Laid-open Patent Publication No. 2008-64683 and Japanese Laid-open Patent Publication No. 2003-98037.

Hitherto, rectangular waves have been used as optical pulses for transmission signals for dispersion measurement. When the difference in propagation time during dispersion measurement is not sufficiently larger than the pulse width (indicated by w) of the rectangular waves, two optical pulses overlap each other, thus making it difficult to measure the difference between the propagation times of the two optical pulses. When the pulse width w of the rectangular waves is reduced, dispersion itself of the optical transmission path causes distortion of the waveform of the optical pulses, thereby making it difficult to measure the difference between the propagation times. In addition, a reduction in the optical pulse width w of the rectangular waves causes the S/N (signal to noise) ratio to decrease. Hence, optical pulses with a small pulse width w are not suitable for measurement of the dispersion in a transmission path that causes a large amount of dispersion.

Since an increase in the pulse width w of the optical pulses improves the S/N ratio, optical pulses with a large pulse width are suitable for measurement of dispersion over a long distance, but make it difficult to perform accurate measurement.

There has also been a method for separating signals for individual wavelengths by using an optical filter at the receiving end. This method, however, requires multiple receivers, thus increasing the overall size of the apparatus.

FIG. 2 illustrates an example of a case in which a difference between propagation times during dispersion measurement is smaller than the rectangular-wave-pulse width of optical pulses. In the example of FIG. 2, the transmitting end launches optical pulses (rectangular waves) with wavelengths $\lambda_1$ and $\lambda_2$ and with a pulse width w into an optical path at the same time ($\Delta t_0=0$) and the receiving end receives the optical pulses through the optical-fiber transmission path. In this case, since the time difference $\Delta t_1$ between the two optical pulses at the receiving end is smaller than the pulse width w of the optical pulses, it is difficult to measure the time difference. Thus, the dispersion in the optical fiber cannot be determined with accuracy.

FIG. 3 illustrates an example of a case in which the pulse width of the rectangular waves of the optical pulses is small during dispersion measurement. In the example of FIG. 3, the transmitting end launches rectangular-wave optical pulses with wavelengths $\lambda_1$ and $\lambda_2$ and with a small pulse width w into the optical fiber at the same time ($\Delta t_0=0$) and the receiving end receives the optical pulses through the optical-fiber transmission path. The reduction in the pulse width increases a dispersion influence on the optical pulses and causes distortion of the waveform, thus making it difficult to measure the time difference between the two optical pulses.

SUMMARY

According to an aspect of the embodiment, a dispersion measurement apparatus includes: a pulse generator to output optical pulses including an optical pulse with a first wavelength and an optical pulse with a second wavelength to an optical transmission path, the second wavelength being different from the first wavelength; a reception pulse analyzer including an optical receiver that receives the optical pulses output by the pulse generator, and an analyzer that performs a wavelet transform on an electrical pulse output through the reception performed by the optical receiver; and a calculator to detect, based on a result of the wavelet transform, a time difference between the optical pulse with the first wavelength and the optical pulse with the second wavelength, and to determine dispersion in the optical transmission path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments will be described below with reference to the accompanying drawings. Configurations according to the embodiments herein are merely exemplary and are not intended to be limiting.

Embodiments

In a dispersion measurement apparatus according to a present embodiment, the transmitting end generates optical pulses by using a wavelet. In the dispersion measurement apparatus according to the present embodiment, upon receiving the optical pulses, the receiving end performs wavelet analysis thereon to determine dispersion.

(Wavelet Transform)

Wavelet transform is one method for analyzing frequencies. Since a set of similarity functions created from local functions is defined for the wavelet transform, simultaneous time-frequency decomposition is possible unlike typical Fourier transform. A Fourier transform using a window function has been known as an example capable of performing a time-frequency transform. In the Fourier transform using the window function, both time and frequency resolutions are fixed depending on how the window function is selected. In contrast, the wavelet transform has a feature of exhibiting a low time resolution for low frequencies and exhibiting a high time resolution for high frequencies.

Letting $\psi$ be a mother wavelet, a wavelet transform T for a signal $x(t)$ is given as:

$$T(a, b) = \frac{1}{\sqrt{a}} \int_{-\infty}^{\infty} x(t) \psi^* \left( \frac{t-b}{a} \right) dt \qquad (2)$$

where a and b represent scale factors.

The factor a is a parameter for determining a rate of enlarging or shrinking the mother wavelet $\psi$ in a time-axis direction. The factor a is equivalent to an inverse of a frequency. The factor b is a parameter for the amount of shift in time.

The wavelet transform $T(a,b)$ has a large value when the correlation between the signal $x(t)$ and the wavelet $\psi((t-b)/a)$ is high. That is, $T(a,b)$ has a large value when the signal $x(t)$ contains a component of a certain frequency (a frequency corresponding to $1/a$) at certain time (time $t=b$).

When the mother wavelet is a Mexican hat wavelet, it is expressed as:

$$\psi\left(\frac{t-b}{a}\right) = \left\{ 1 - \left(\frac{t-b}{a}\right)^2 \right\} e^{-\frac{1}{2}\left(\frac{t-b}{a}\right)^2} \qquad (3)$$

As can be understood from equation (3), the size of the mother wavelet $\psi$ decreases in the time-axis direction, as the factor a is reduced. As can be understood from equation (3), the mother wavelet $\psi$ has a symmetrical waveform with respect to time $t=b$.

The mother wavelet (also referred to as "wavelet") used in the present embodiment is not limited to a Mexican hat wavelet.

(Basic Configuration)

Figure 1:
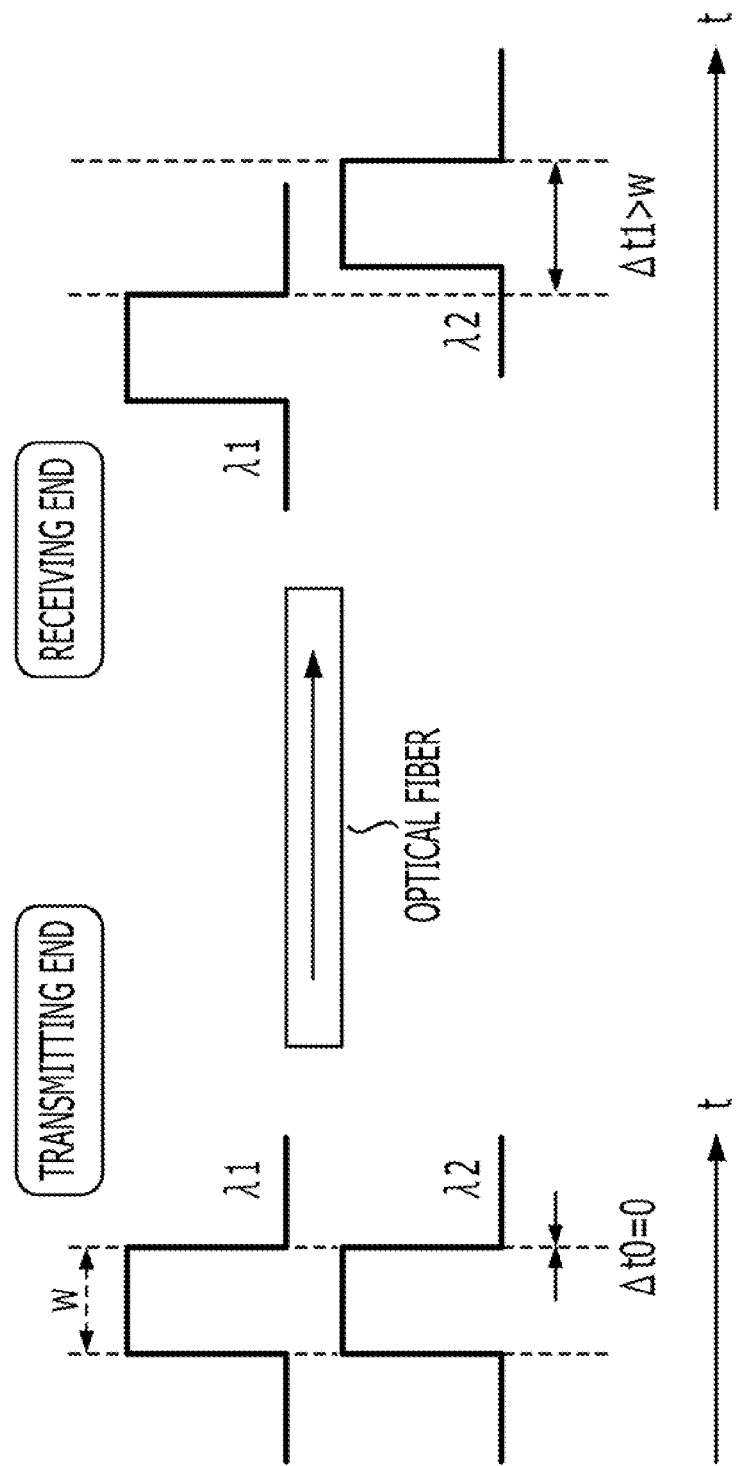
FIG. 1 illustrates an example of dispersion measurement.
Figure 2:
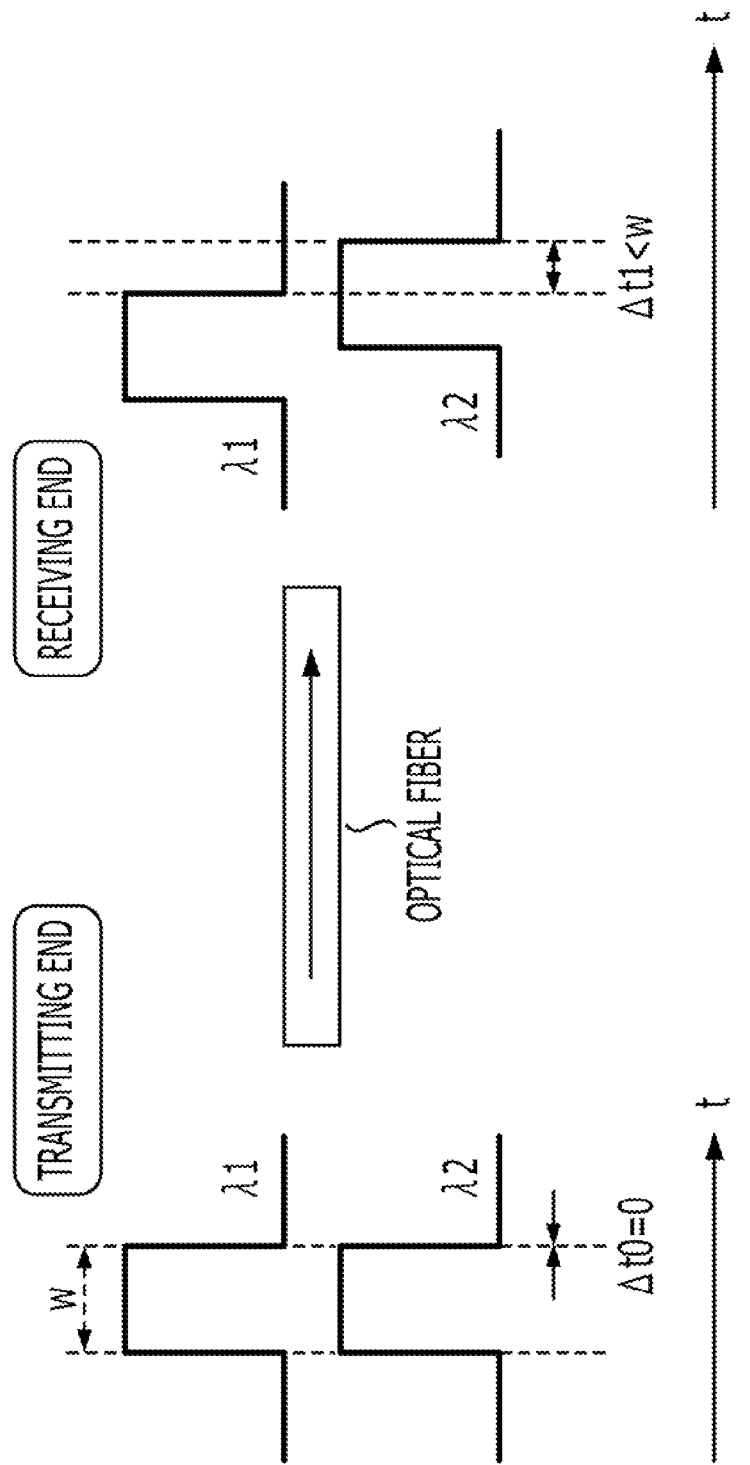
FIG. 2 illustrates an example of a case in which, during dispersion measurement, the difference between propagation times is smaller than the rectangular-wave pulse width of optical pulses.
Figure 3:
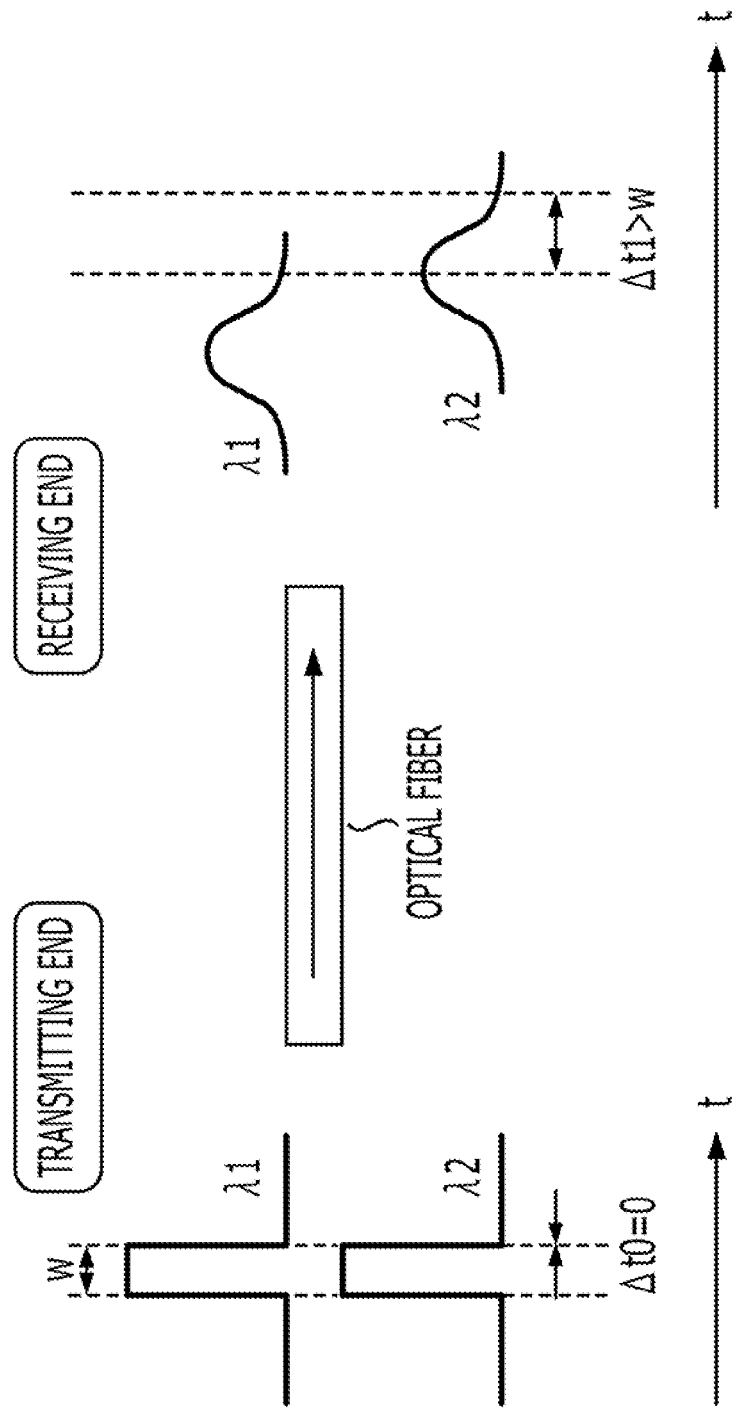
FIG. 3 illustrates an example of a case in which the pulse width of the rectangular waves of the optical pulses is small during dispersion measurement.
Figure 4:
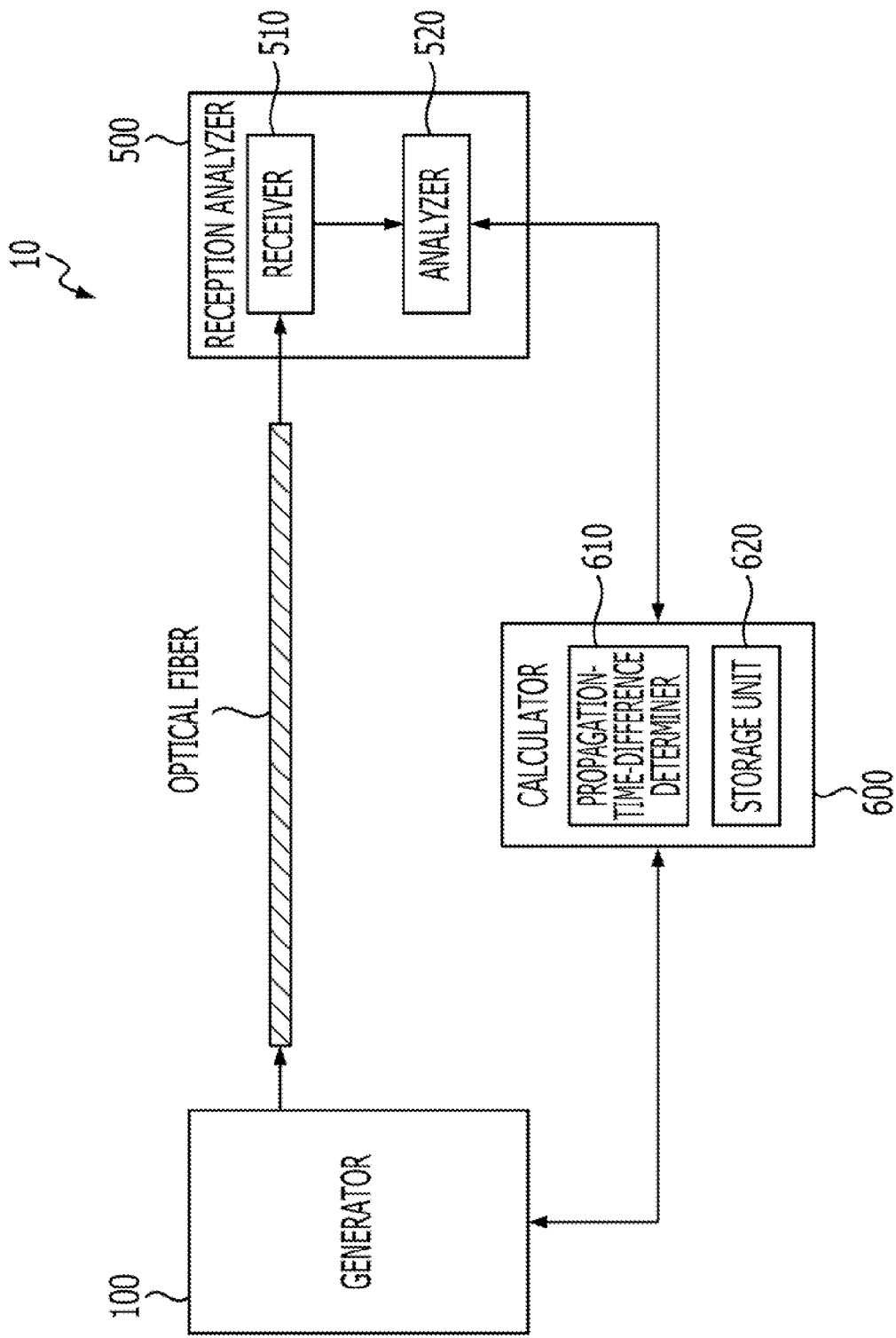
FIG. 4 is a diagram illustrating an example of a basic configuration of a dispersion measurement apparatus according to an embodiment.

FIG. 4 is a diagram illustrating an example of a basic configuration of the dispersion measurement apparatus according to the embodiment. A dispersion measurement apparatus 10 includes a generator 100, a reception pulse analyzer 500, and a calculator 600. The generator 100 and the reception pulse analyzer 500 are connected to each other through an optical transmission path. The optical transmission path may employ any light transmissive medium, for example, an optical fiber.

The generator 100 generates wavelet pulse signals, modulates the wavelet pulse signals into carriers having different frequencies from each other, combines the modulated carriers, and launches the resulting signals into the optical fiber.

The reception pulse analyzer 500 receives the signals from the generator 100 through the optical fiber and analyzes the received signals. The reception pulse analyzer 500 has a receiver 510 and an analyzer 520. The receiver 510 receives the optical pulses from the generator 100 through the optical fiber, amplifies the optical pulses, and outputs the resulting signals to the analyzer 520. The analyzer 520 performs A/D (analog to digital) conversion on the signals input from the receiver 510 and performs wavelet analysis on the resulting signals.

On the basis of a result of the analysis performed by the reception pulse analyzer 500, the calculator 600 determines the value of dispersion in the optical fiber. The calculator 600 is connected to the generator 100 and the reception pulse analyzer 500. The calculator 600 has a propagation-time-difference determiner 610 and a storage unit 620.

(Exemplary Configuration of Generator)

Figure 5:
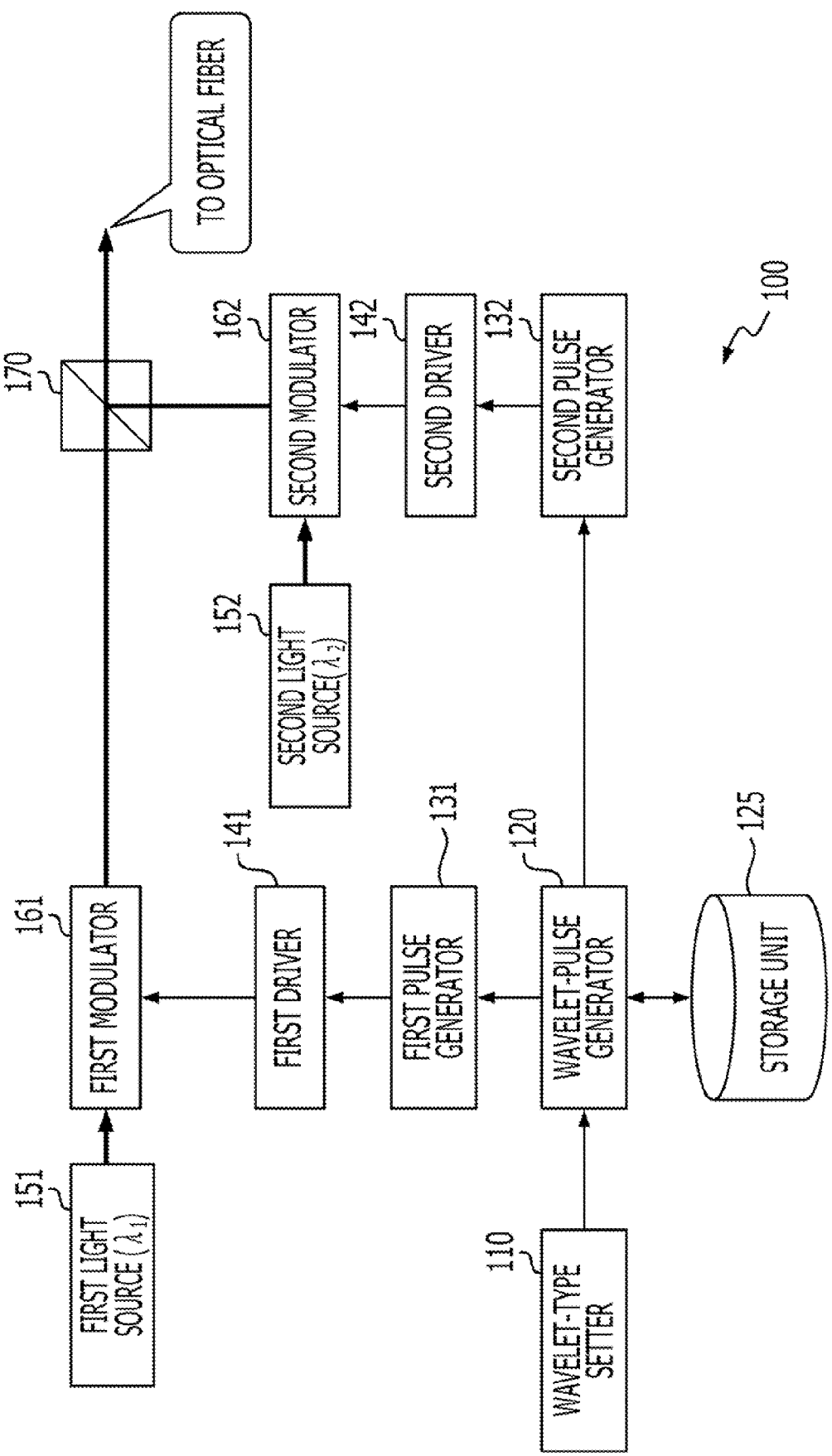
FIG. 5 is a diagram illustrating an exemplary configuration of a generator in the dispersion measurement apparatus.

FIG. 5 is a diagram illustrating an exemplary configuration of the generator in the dispersion measurement apparatus. As illustrated in FIG. 5, the generator 100 in the dispersion measurement apparatus 10 includes a wavelet-type setter 110, a wavelet-pulse generator 120, a first pulse generator 131, a second pulse generator 132, a first driver 141, and a second driver 142. The generator 100 further includes a first light source 151, a second light source 152, a first modulator 161, a second modulator 162, and a multiplexer 170. That is, the generator 100 includes two modulators (optical modulators) 161 and 162. The wavelet-type setter 110 and the wavelet-pulse generator 120 may be implemented using, for example, software executed on a computer, a dedicated DSP (digital signal processor), an ASIC (application specific integrated circuit), or an FPGA (field-programmable gate array).

The wavelet-type setter 110 receives, from a user or the like, a type (shape), order, pulse width, and so on of a wavelet pulse to be created. The wavelet-type setter 110 issues, to the wavelet-pulse generator 120, an instruction indicating the received type, order, pulse width, and so on of the wavelet pulse to be created.

The wavelet-pulse generator 120 generates a wavelet pulse as indicated by the instruction issued from the wavelet-type setter 110. The wavelet-pulse generator 120 extracts, from a parameter table stored in a storage unit 125, parameters for generating the wavelet pulse. On the basis of the extracted parameters, the wavelet-pulse generator 120 generates a waveform of the wavelet pulse. The wavelet-pulse generator 120 may add a predetermined direct-current (DC) offset value to the generated wavelet pulse. The wavelet-pulse generator 120 outputs the generated wavelet pulse to the first pulse generator 131 and the second pulse generator 132. In this case, the same wavelet pulse is output to the first pulse generator 131 and the second pulse generator 132. The offset value is set to a certain value such that the wavelet pulse input to the first pulse generator 131 does not have a negative value. That is, when the minimum value of the generated wavelet pulse is negative, the predetermined offset value is larger than or equal to the absolute of the minimum value. That is, when the minimum value of the generated wavelet pulse is positive, the predetermined offset value may be zero. When no predetermined offset value is added, the amplitude of light modulated by the first modulator 161 is controlled to have a negative value to thereby render a modulation signal abnormal. For this reason, the offset value is added. Instead of the wavelet-pulse generator 120 adding the offset value, the wavelet-pulse generator 120 may instruct the first modulator 161 so that it applies a direct-current bias corresponding to the offset value. The wavelet-pulse generator 120 transmits information of the wavelengths of light of the first light source 151 and the second light source 152 to the calculator 600. The wavelet-pulse generator 120 may also transmit information of the shape and so on of the generated wavelet pulse to the reception pulse analyzer 500 via the calculator 600.

The waveform of the pulse generated by the wavelet-pulse generator 120 is not limited to a wavelet, and may be, for example, a rectangular wave.

The storage unit 125 stores a parameter table containing parameters based on which wavelet pulse the wavelet-pulse generator 120 generates. The storage unit 125 is implemented by, for example, a memory or a hard disk drive.

The first pulse generator 131 receives the wavelet pulse from the wavelet-pulse generator 120. The first pulse generator 131 performs D/A (digital to analog) conversion on the received wavelet pulse to convert it from a digital signal to an analog signal. The first pulse generator 131 outputs the wavelet pulse, converted into the analog signal, to the first driver 141.

The first driver 141 receives the wavelet pulse from the first pulse generator 131. The first driver 141 outputs the received wavelet pulse to the first modulator 161 through timing control.

The first light source 151 outputs light with a predetermined wavelength $\lambda_1$ to the first modulator 161. The wavelength of the light output by the first light source 151 may be specified by the wavelet-pulse generator 120. The first light source 151 may be implemented by, for example, a semiconductor laser.

In accordance with the waveform of the wavelet pulse signal input from the first driver 141, the first modulator 161 performs amplitude modulation on the light with the wavelength $\lambda_1$ from the first light source 151. A method for the first modulator 161 to control the light may involve, for example, a semiconductor electro-optic effect and electroabsorption. The first modulator 161 may be implemented by, for example, a semiconductor optical modulator or an LN (lithium niobate) modulator.

The second pulse generator 132, the second driver 142, the second light source 152, and the second modulator 162 operate similarly to the first pulse generator 131, the first driver 141, the first light source 151, and the first modulator 161, respectively. The second light source 152, however, outputs light with a wavelength $\lambda_2$. The wavelengths $\lambda_1$ and $\lambda_2$ are different from each other.

The multiplexer 170 combines an output of the first modulator 161 and an output of the second modulator 162 and launches the combined light into the optical fiber. That is, the light with the wavelength $\lambda_1$ and the light with the wavelength $\lambda_2$ which have the same waveform are launched into the optical fiber.

Since the light with the different wavelengths and with the same waveform are launched into the optical fiber, the generator 100 does not need to have a configuration for measuring a time difference between the pulses. Also, for example, an output of the first modulator 161 may be introduced into a known-length transmission path to give a known time difference between the light with the wavelength $\lambda_1$ and the light with the wavelength $\lambda_2$. A true propagation-time difference may also be determined from the known time difference and a time difference detected at a receiving end.

(Exemplary Configuration of Reception Pulse Analyzer)

Figure 6:
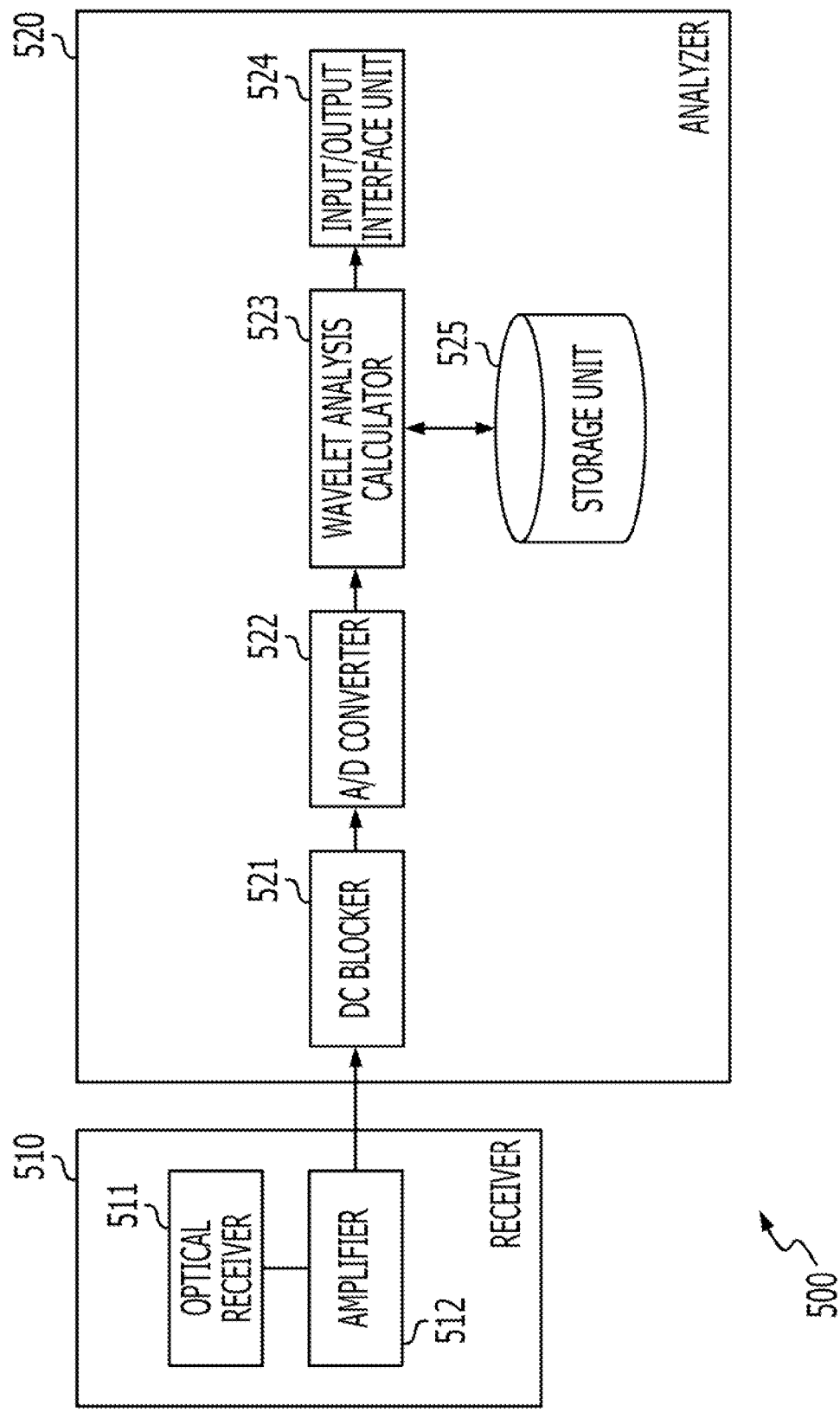
FIG. 6 is a diagram illustrating an exemplary configuration of a reception pulse analyzer.

FIG. 6 is a diagram illustrating an exemplary configuration of the reception pulse analyzer. As described above, the reception pulse analyzer 500 has the receiver 510 and the analyzer 520. The receiver 510 has an optical receiver 511 and an amplifier 512. The analyzer 520 has a DC (direct current) blocker 521, an A/D converter 522, a wavelet analysis calculator 523, an input/output interface unit 524, and a storage unit 525.

The optical receiver 511 in the receiver 510 receives the light from the generator 100 through the optical fiber. The optical receiver 511 converts the received pulsed light into an electrical signal and outputs the electrical signal to the amplifier 512. The receiver 510 may be implemented by, for example, a photodiode or a PIN photodiode.

The amplifier 512 amplifies the electrical signal input from the optical receiver 511 and outputs the resulting electrical signal to the analyzer 520.

The DC blocker 521 in the analyzer 520 blocks DC components of the signal input from the amplifier 512 in the receiver 510. Since DC components are rarely taken into account during wavelet analysis, the DC blocker 521 may be eliminated.

The A/D converter 522 converts the input signal from an analog signal into a digital signal.

The wavelet analysis calculator 523 stores, in the storage unit 525, the signal input from the A/D converter 522. The wavelet analysis calculator 523 also performs a wavelet transform on the signal stored in the storage unit 525, in accordance with equation (2) noted above. The wavelet analysis calculator 523 performs the wavelet transform in accordance with equation (2), at least during reception of the signal transmitted from the generator 100. The wavelet analysis calculator 523 may receive the information of the shape and so on of the wavelet of the optical pulse, launched from the generator 100 into the optical fiber, through the calculator 600. When the wavelet analysis calculator 523 performs a wavelet transform using the shape (type) of the wavelet of the launched optical pulse, the value of T in equation (2) increases. As a result of the wavelet transform using the shape of the wavelet of the launched optical pulse, the correlation between the reception signal and the wavelet increases and thus the value of T in equation (2) increases. In other words, an influence of noise generated by an optical amplifier or the like provided on the optical transmission path is reduced. As a result of the reduction in the influence of noise, dispersion can be measured with accuracy.

When the optical pulse that is launched from the generator 100 into the optical fiber has a wavelet, the correlation between the reception signal and the wavelet increases compared to a case in which the optical pulse has a rectangular wave. Thus, the value of T in equation (2) increases. Accordingly, when a wavelet waveform, not a rectangular wave, is used for the optical pulse launched into the optical fiber, an influence of noise generated by the optical amplifier or the like provided on the optical transmission path is reduced.

The wavelet analysis calculator 523 is implemented by, for example, software executed on a computer or a dedicated DSP (digital signal processor).

The storage unit 525 stores the signal converted into the digital signal by the A/D converter 522. The storage unit 525 also stores a result of the wavelet transform performed by the wavelet analysis calculator 523. The storage unit 525 stores parameters and so on used for the wavelet transform. The storage unit 525 may be implemented by, for example, a RAM (random access memory), a flash memory, or a hard disk drive.

The input/output interface unit 524 performs information input/output with the calculator 600 and so on.

(Exemplary Configuration of Calculator)

On the basis of a result of the wavelet transform performed by the reception pulse analyzer 500, the calculator 600 determines dispersion in the optical fiber. The calculator 600 has a propagation-time-difference determiner 610 and a storage unit 620.

The propagation-time-difference determiner 610 in the calculator 600 receives the information of the wavelengths of the light launched from the generator 100 into the optical fiber. The propagation-time-difference determiner 610 stores, in the storage unit 620, the information of the wavelengths of the received light. The propagation-time-difference determiner 610 may receive the information of the shape and so on of the wavelet of the optical pulse launched from the generator 100 into the optical fiber and may store the information in the storage unit 620. The propagation-time-difference determiner 610 may also transmit, to the reception pulse analyzer 500, the information of the shape and so on of the wavelet of the optical pulse launched from the generator 100 into the optical fiber.

The propagation-time-difference determiner 610 receives the wavelet-transform result from the reception pulse analyzer 500 and stores the result in the storage unit 620. On the basis of the received wavelet-transform result, the propagation-time-difference determiner 610 detects a time difference between two optical pulses received by the reception pulse analyzer 500. A method for detecting the time difference between two optical pulses on the basis of the wavelet-transform result is described below. The propagation-time-difference determiner 610 determines dispersion in the optical fiber in accordance with equation (1) and on the basis of the wavelengths of two optical pulses launched into the optical fiber and the time difference between the two optical pulses received from the optical fiber. The calculator 600 is implemented by, for example, software executed on a computer or a dedicated DSP (digital signal processor).

(First Modification of Generator)

Figure 7:
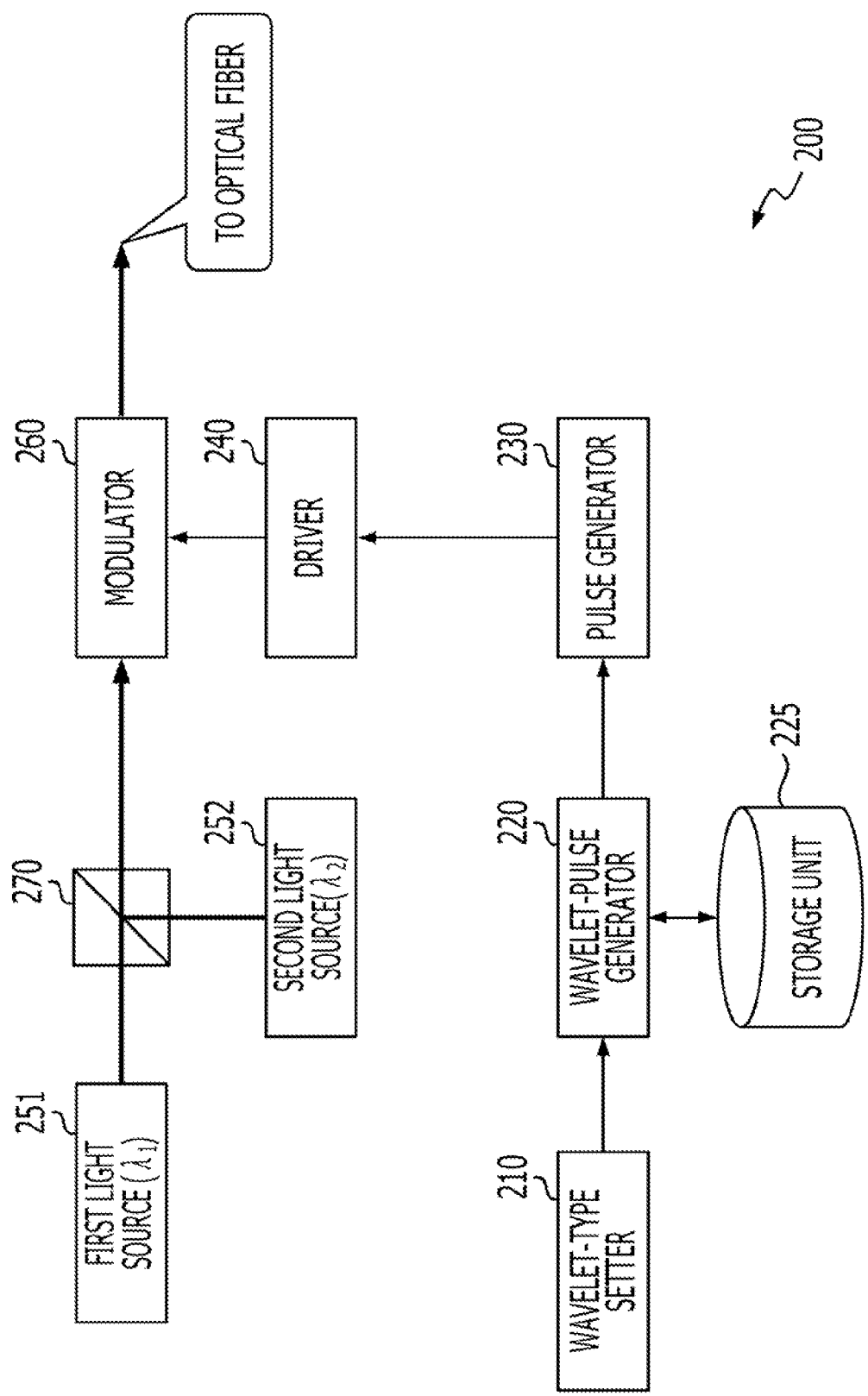
FIG. 7 is a diagram illustrating a first modification of the generator in the dispersion measurement apparatus.

FIG. 7 is a diagram illustrating a first modification of the generator in the dispersion measurement apparatus. In the example of FIG. 7, a generator 200 is used instead of the generator 100 in FIG. 4. The generator 200 is similar to the generator 100. Herein, different points will be mainly described. The generator 200 is mainly different from the generator 100 in that one modulator is provided.

The generator 200 in FIG. 7 includes a wavelet-type setter 210, a wavelet-pulse generator 220, a pulse generator 230, and a driver 240. The generator 200 further includes a first light source 251, a second light source 252, a modulator 260, and a multiplexer 270.

The wavelet-pulse generator 220 generates a wavelet pulse as indicated by the instruction issued from the wavelet-type setter 210. The wavelet-pulse generator 220 extracts, from a parameter table stored in a storage unit 225, parameters for generating a wavelet pulse. On the basis of the extracted parameters, the wavelet-pulse generator 220 generates the (waveform of) wavelet pulse. The wavelet-pulse generator 220 outputs the generated wavelet pulse to the pulse generator 230.

The waveform of the pulse generated by the wavelet-pulse generator 220 is not limited to a wavelet, and may be, for example, a rectangular wave.

The driver 240 receives the wavelet pulse from the pulse generator 230. The driver 240 outputs the received wavelet pulse to the modulator 260 through timing control.

The first light source 251 outputs light with a wavelength $\lambda_1$ to the multiplexer 270. Similarly, the second light source 252 outputs light with a wavelength $\lambda_2$ to the multiplexer 270.

The multiplexer 270 combines the light with the wavelength $\lambda_1$ from the first light source 251 and the light with the wavelength $\lambda_2$ from the second light source 252 and outputs the combined light to the modulator 260.

In accordance with the waveform of the wavelet-pulse signal input from the driver 240, the modulator 260 performs amplitude modulation on the light from the multiplexer 270. The modulator 260 launches the modulated light into the optical fiber. That is, the light with the wavelength $\lambda_1$ and the light with the wavelength $\lambda_2$ which have the same waveform are launched into the optical fiber.

According to the generator 200, the modulators can be integrated into one modulator, so that the configuration of the generator is simplified compared to the generator 100.

(Second Modification of Generator)

Figure 8:
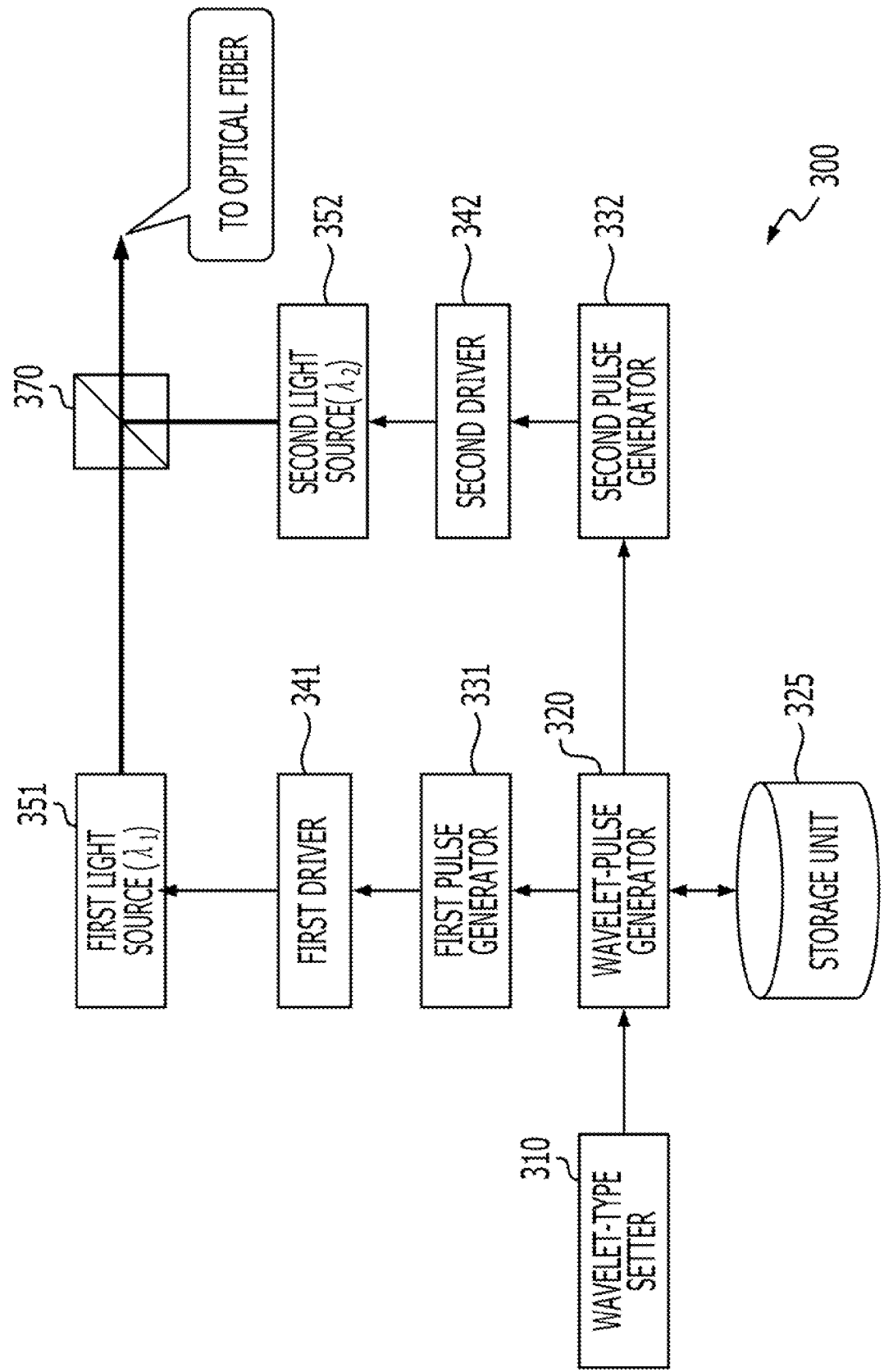
FIG. 8 is a diagram illustrating a second modification of the generator in the dispersion measurement apparatus.

FIG. 8 is a diagram illustrating a second modification of the generator in the dispersion measurement apparatus. In the example of FIG. 8, a generator 300 is used instead of the generator 100 in FIG. 4. The generator 300 is similar to the generator 100. Herein, different points are mainly described. The generator 300 is mainly different from the generator 100 in that no modulator is provided. The generator 300 directly performs modulation.

The generator 300 in FIG. 8 includes a wavelet-type setter 310, a wavelet-pulse generator 320, a first pulse generator 331, a second pulse generator 332, a first driver 341, and a second driver 342. The generator 300 further includes a first light source 351, a second light source 352, and a multiplexer 370.

The wavelet-pulse generator 320 adds an offset value to a generated wavelet pulse. The offset value is set to a certain value such that the wavelet pulse input to the first pulse generator 331 does not have a negative value.

The waveform of the pulse generated by the wavelet-pulse generator 320 is not limited to a wavelet, and may be, for example, a rectangular wave.

The first driver 341 receives the wavelet pulse from the first pulse generator 331. The first driver 341 outputs the received wavelet pulse to the first light source 351 through timing control.

The first light source 351 modulates drive power with an amplitude corresponding to the waveform of the wavelet pulse signal input from the first driver 341 and outputs light with a wavelength $\lambda_1$.

The second pulse generator 332, the second driver 342, and the second light source 352 operate similarly to the first pulse generator 331, the first driver 341, and the first light source 351, respectively. The second light source 352, however, outputs light with a wavelength $\lambda_2$.

The multiplexer 370 combines the light from the first light source 351 and the light from the second light source 352 and launches the combined light into the optical fiber.

According to the generator 300, no optical modulator is necessary, so that the configuration of the generator is simplified compared to the generators 100 and 200.

(Example of Waveform)

A description will be given of an example of a transmission waveform generated by the generator 100 or the like and an example of a reception waveform received by the reception pulse analyzer 500. While a transmission waveform generated by the generator 100 is described below, the same is also applicable to a case in which the generator 200 or 300 is used instead of the generator 100.

(First Example of Transmission Waveform)

Figure 9:
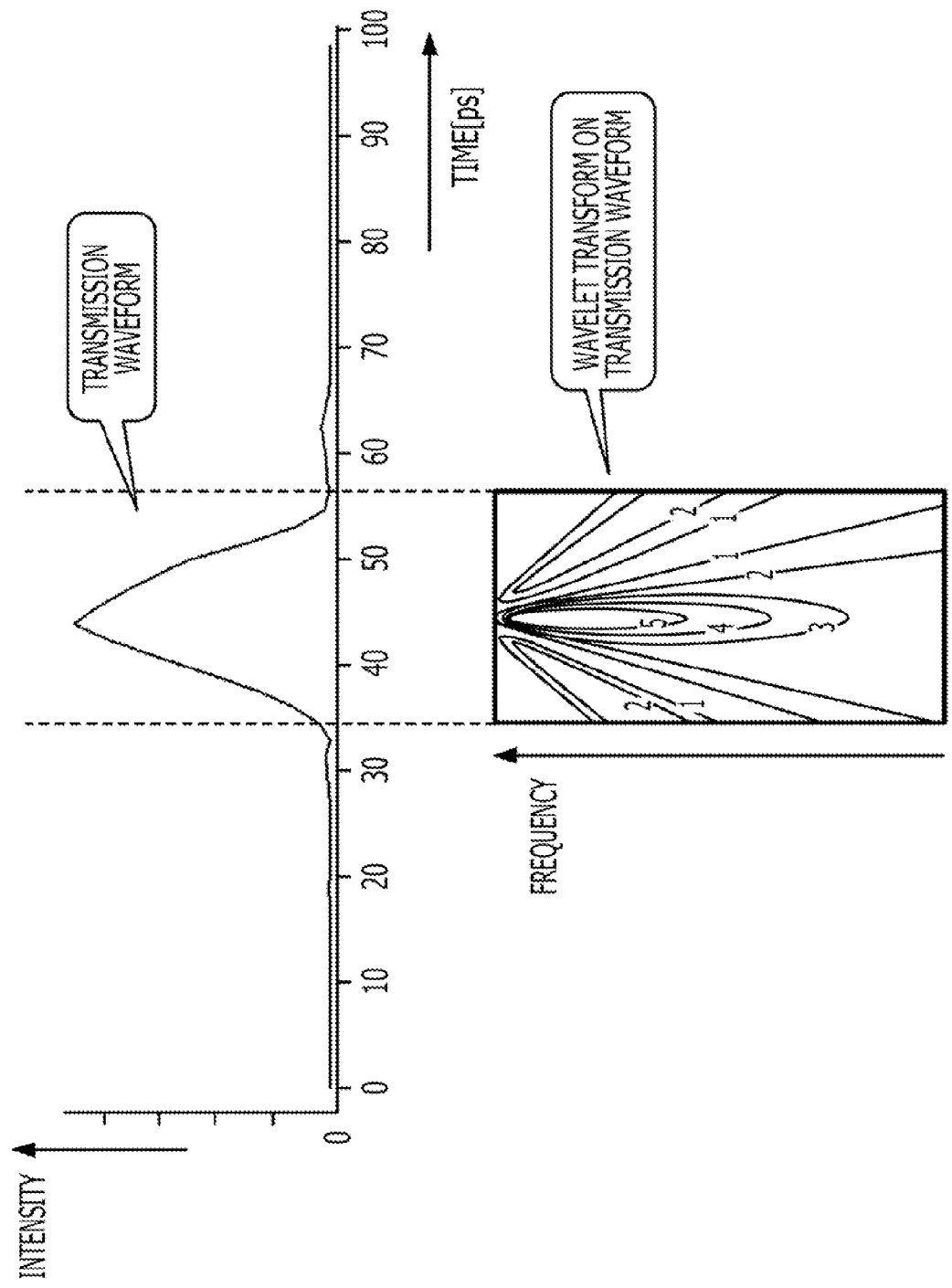
FIG. 9 illustrates an example of a transmission waveform generated by the generator and an example of a result obtained by performing a wavelet transform on the transmission waveform.

FIG. 9 illustrates an example of a transmission waveform generated by the generator and an example of a result obtained by performing a wavelet transform on the transmission waveform.

The upper part in FIG. 9 illustrates an example of a waveform (transmission waveform) of optical pulses (wavelet pulses) launched from the generator 100 into the optical fiber. The horizontal axis in the upper part in FIG. 9 indicates time and the vertical axis indicates light intensity. The pulse width of the wavelet pulses in the upper part in FIG. 9 is about 16 ps. The wavelet pulses in the upper part in FIG. 9 include pulses with two wavelengths. However, since the time difference between the two pulses is zero, the two pulses appear as a single pulse.

The lower part in FIG. 9 illustrates an example of a result obtained by performing a wavelet transform on the optical pulses launched from the generator 100 into the optical fiber. The horizontal axis in the lower part in FIG. 9 indicates time and the vertical axis indicates frequency. The horizontal axis in the lower part in FIG. 9 is the same as the horizontal axis in the upper part in FIG. 9. When viewed in the time-axis direction with the frequency being regarded as being constant, three peaks are present. The peaks indicate that the value of T in equation (2) is large. The position (time) of the center one of the three peaks matches the position of the peak of the transmission waveform in the upper part in FIG. 9. That is, the center peak indicates that the correlation between the transmission signal and the wavelet is high at the position (time) of the center peak.

(First Example of Reception Waveform)

Figure 10:
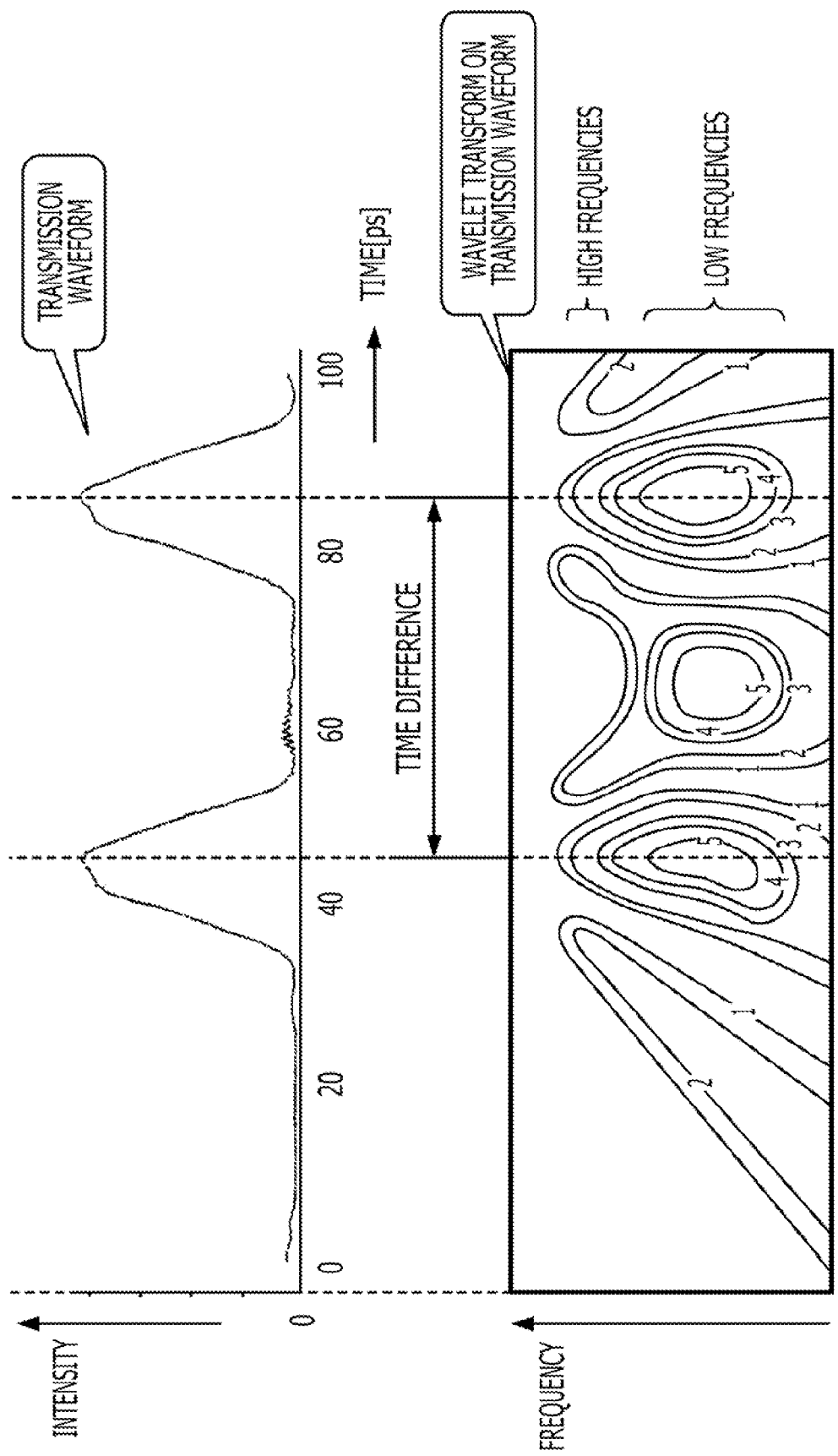
FIG. 10 illustrates an example of a reception waveform received by an optical receiver in the reception pulse analyzer and an example of a result obtained by performing, using an analyzer in the reception pulse analyzer, a wavelet transform on the reception waveform.

FIG. 10 illustrates an example of a reception waveform received by the optical receiver in the reception pulse analyzer and an example of a result obtained by performing, using the analyzer in the reception pulse analyzer, a wavelet transform on the reception waveform.

The upper part in FIG. 10 illustrates an example of a waveform (reception waveform) of optical pulses (wavelet pulses) received from the optical fiber. The horizontal axis in the upper part in FIG. 9 indicates time and the vertical axis indicates light intensity. The pulse width of the wavelet pulses in the upper part in FIG. 10 is about 16 ps. The wavelet pulses in the upper part in FIG. 10 include pulses with two wavelengths. The two pulses are pulses that were simultaneously launched from the generator into the optical fiber, but have a time difference due to the dispersion in the optical fiber. In the example of the upper part in FIG. 10, the time difference between the optical pulses is about 40 ps. This time difference is sufficiently larger than the pulse width.

The lower part in FIG. 10 illustrates an example of a result obtained by performing, using the analyzer 520, a wavelet transform on the optical pulses received from the optical fiber. The horizontal axis in the lower part in FIG. 10 indicates time and the vertical axis indicates frequency. The horizontal axis in the lower part in FIG. 10 is the same as the horizontal axis in the upper part in FIG. 10. When viewed in the time-axis direction, it can be seen that the position of the second peak from the left and the position of the second peak from the right, across the low frequencies (low-order components) and the high frequencies (high-order components), correspond to the positions of the peaks of the reception waveform. These peaks indicate that the correlations between the reception waveform and the wavelet waveform are high at the positions (times) of the peaks. That is, in the result of the wavelet transform, the gap between the position of the second peak from the left and the position of the second peak from the right corresponds to the time difference between the optical pulses. The calculator 600 can determine the time difference between two optical pulses by detecting, in the result of the wavelet transform, the position of the second peak from the left and the position of the second peak from the right and measuring the time difference between the positions.

(Second Example of Reception Waveform)

Figure 11:
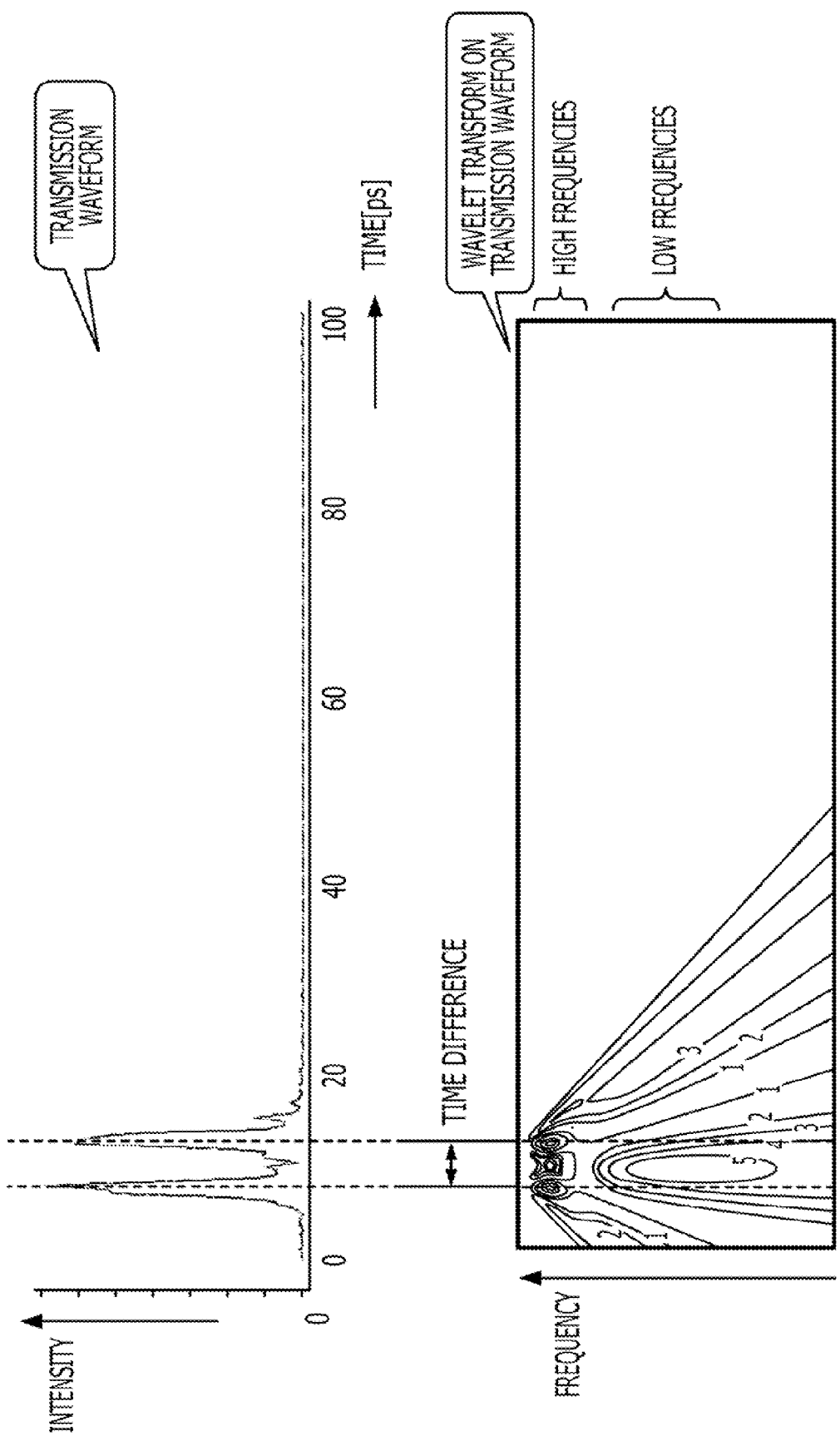
FIG. 11 illustrates an example of a reception waveform received by the optical receiver in the reception pulse analyzer and an example of a result obtained by performing, using the analyzer in the reception pulse analyzer, a wavelet transform on the reception waveform.

FIG. 11 illustrates a reception waveform received by the optical receiver in the reception pulse analyzer and an example of a result obtained by performing, using the analyzer in the reception pulse analyzer, a wavelet transform on the reception waveform. In the example of FIG. 11, the ratio of the pulse width of optical pulses to the time difference between the optical pulses is small, compared to the example of FIG. 10.

The pulse width of the wavelet pulses in the upper part in FIG. 11 is about 4.5 ps. The wavelet pulses in the upper part in FIG. 11 include pulses with two wavelengths. The two pulses are pulses that were simultaneously launched from the generator into the optical fiber, but have a time difference due to the dispersion in the optical fiber. In the example of the upper part in FIG. 11, the time difference between the optical pulses is about 3 ps.

The lower part in FIG. 11 illustrates an example of a result obtained by performing, using the analyzer 520, a wavelet transform on the optical pulses received from the optical fiber. The horizontal axis in the lower part in FIG. 11 is the same as the horizontal axis in the upper part in FIG. 11. When viewed in the time-axis direction, three peaks are present at low frequencies (low-order components) and five or six peaks are present at high frequencies (high-order components). It can be seen that the position of the second peak from the left and the position of the second peak from the right, the peaks being present in the high frequencies, correspond to the positions of the peaks of the reception waveform. That is, in the result of the wavelet transform, the gap between the position of the second peak from the left and the position of the second peak from the right, the peaks being present in the high frequencies, corresponds to the time difference between the optical pulses. Those peaks indicate that the correlations between the reception waveform and the wavelet waveform are high at the positions (times) and the frequencies of the peaks. That is, it can be presumed that the signals from the generator 100 were received at the positions (times) of the peaks. That is, the gap between the position of the second peak from the left and the position of the second peak from the right, the peaks being present in the high frequencies, is measured in the result of the wavelet transform, so that the time difference between the optical pulses is detected. The calculator 600 can determine the time difference between two optical pulses by detecting, in the result of the wavelet transform, the position of the second peak from the left and the position of the second peak from the right in the high frequencies and measuring the time difference between the positions. The reason why the time difference is determined from the high-frequency components is that the wavelet transform has a property of exhibiting a high time resolution for high frequencies.

(Third Example of Reception Waveform)

Figure 12:
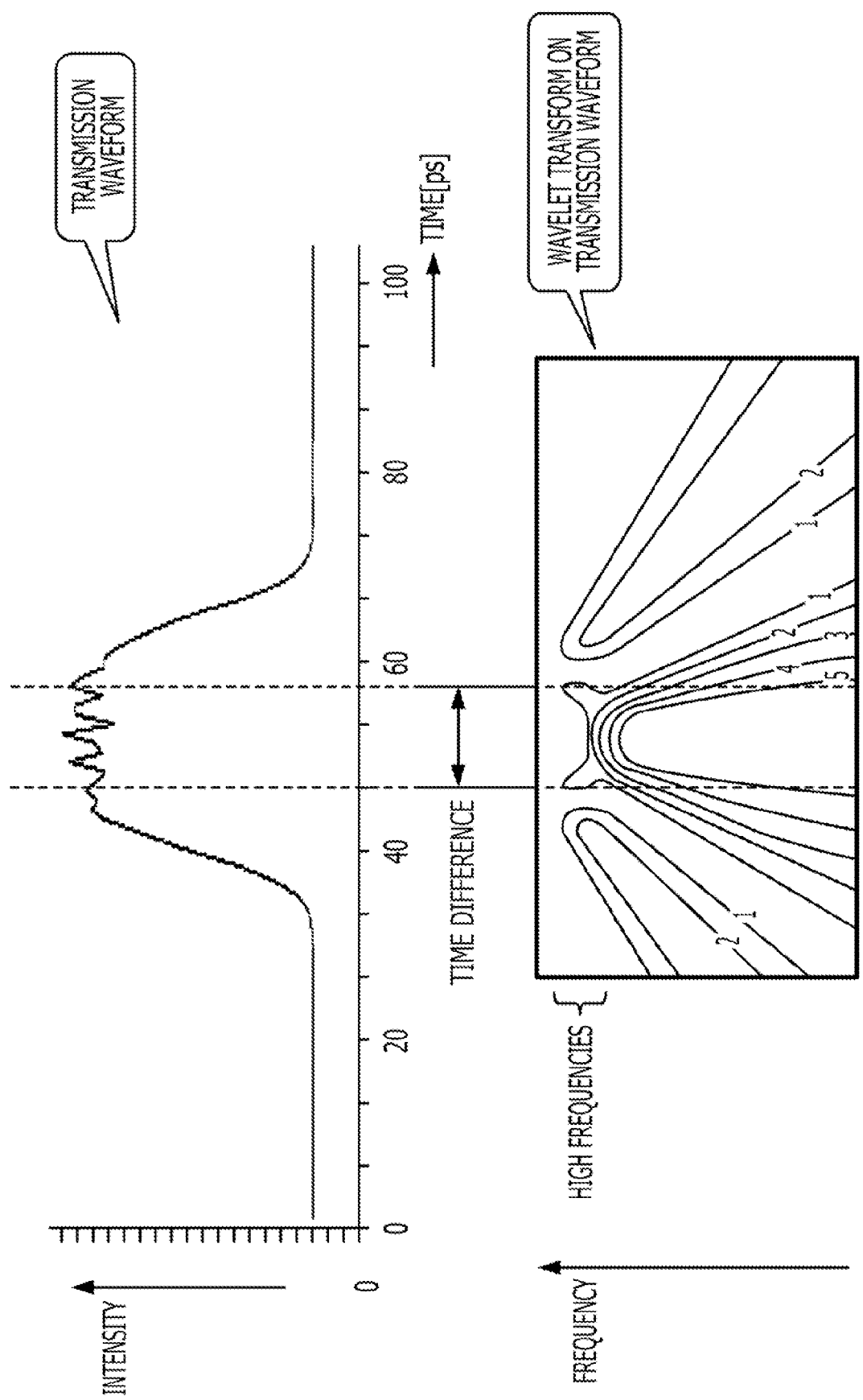
FIG. 12 illustrates an example of a reception waveform received by the optical receiver in the reception pulse analyzer and an example of a result obtained by performing, using the analyzer in the reception pulse analyzer, a wavelet transform on the reception waveform.

FIG. 12 illustrates an example of a reception waveform received by the optical receiver in the reception pulse analyzer and an example of a result obtained by performing, using the analyzer in the reception pulse analyzer, a wavelet transform on the reception waveform. In the example of FIG. 12, the time difference between optical pulses is small, so that the two optical pulses overlap each other.

The pulse width of the transmitted wavelet pulses in the upper part in FIG. 12 is about 16 ps. The wavelet pulses in the upper part in FIG. 12 include pulses with two wavelengths. The two pulses are pulses that were simultaneously launched from the generator into the optical fiber, but have a time difference due to the dispersion in the optical fiber. The time difference between the optical pulses is 10.1 ps, which is a calculated value. This time difference is smaller than the pulse width of the optical pulses. Thus, the two optical pulses overlap each other at the receiving end. In this case, the time difference between the two optical pulses cannot be detected from the reception waveform.

The lower part in FIG. 12 illustrates an example of a result obtained by performing, using the analyzer 520, a wavelet transform on the optical pulses received from the optical fiber. The horizontal axis in the lower part in FIG. 12 is the same as the horizontal axis in the upper part in FIG. 12. When viewed in the time-axis direction, four or five peaks are present at high frequencies (high-order components). The gap between the position of the second peak from the left and the position of the second peak from the right, the peaks being present in the high frequencies, corresponds to the time difference between the optical pulses. In this case, the gap between the position of the second peak from the left and the position of the second peak from the right is about 14 ps. This gap corresponds to the time difference between the optical pulses. Thus, even when the time difference between two received optical pulses is smaller than the pulse width of the optical pulses, the calculator 600 detects the time difference between the two optical pulses through the use of the result of the wavelet transform.

(Example of Determination of Pulse Propagation-Time Difference)

Now, a description will be given of an example of a procedure for determining a pulse propagation-time difference.

The wavelet analysis calculator 523 in the reception pulse analyzer 500 performs a wavelet transform on a received signal, in accordance with equation (2). The reception pulse analyzer 500 transmits a result of the wavelet transform to the calculator 600.

The propagation-time-difference determiner 610 in the calculator 600 creates a time-versus-frequency map on the basis of the wavelet-transform result received from the reception pulse analyzer 500. In this case, let $\Delta t$ be a time step and let $\Delta f$ be a frequency step.

The propagation-time-difference determiner 610 cuts out, at regular intervals ($\Delta f$), data with respect to frequency regions from high-frequency components in the created time-versus-frequency map to obtain one-dimensional data for the entire time width. In one-dimensional data for a certain frequency, a large numeric value means that the component of the corresponding frequency is intense. The propagation-time-difference determiner 610 converts the one-dimensional data into one-dimensional graphs for respective frequencies.

The propagation-time-difference determiner 610 searches for, in the one-dimensional graphs, a one-dimensional graph for the frequency at which four or more peaks are present. In this case, the propagation-time-difference determiner 610 may first search for a one-dimensional graph for a low frequency or may first search for a one-dimensional graph for a high frequency.

Upon obtaining a one-dimensional graph having four or more peaks, the propagation-time-difference determiner 610 extracts the times of two points, i.e., the second peak from the peak having a smallest one of the time components of the positions of the peaks and the second peak from the peak having a largest one of the time components, and regards the two points as t1 and t2, respectively. The propagation-time-difference determiner 610 logs t2-t1 as a pulse propagation-time difference and stores the time difference in the storage unit 620.

The reason why the times of two points, i.e., the second peak from the peak having a smallest one of the time components of the positions of the peaks and the second peak from the peak having a largest one of the time components, are extracted to obtain the propagation time difference is as follows. Peaks appear not only at intense-frequency components, but also at portions where the pulse amplitude is small, as can be seen from the graphical representation indicating the result of the wavelet transform. For example, when a sufficient time difference exists between two pulses, other peaks are also found before and after one pulse. The peaks before and after one pulse presumably indicate frequency components corresponding to a pulse rising portion (i.e., the left side of the center of the pulse) and a pulse falling portion (i.e., the right side of the center of the pulse). Thus, the peak at the leftmost end and the peak at the rightmost end, viewed along the time axis, indicate a pulse front portion that arrives at an observation point first and a pulse rear portion that arrives next, respectively. Accordingly, the propagation-time difference between two pulses can be obtained based on the time difference between two points, i.e., the second peak from the peak at which the time component is the smallest and the second peak from the peak at which the time component is the largest.

(Specific Exemplary Configuration of Generator, Reception Pulse Analyzer, and Calculator)

Each of the generators 100, 200, and 300, the reception pulse analyzer 500, and the calculator 600 may be implemented using a general-purpose computer, such as a personal computer (PC), or a dedicated computer, such as a server machine. Each of the generators 100, 200, and 300, the reception pulse analyzer 500, and the calculator 600 may also be implemented using a dedicated or general-purpose computer, such as a mobile terminal, or electronic equipment into which a computer is incorporated.

Figure 16:
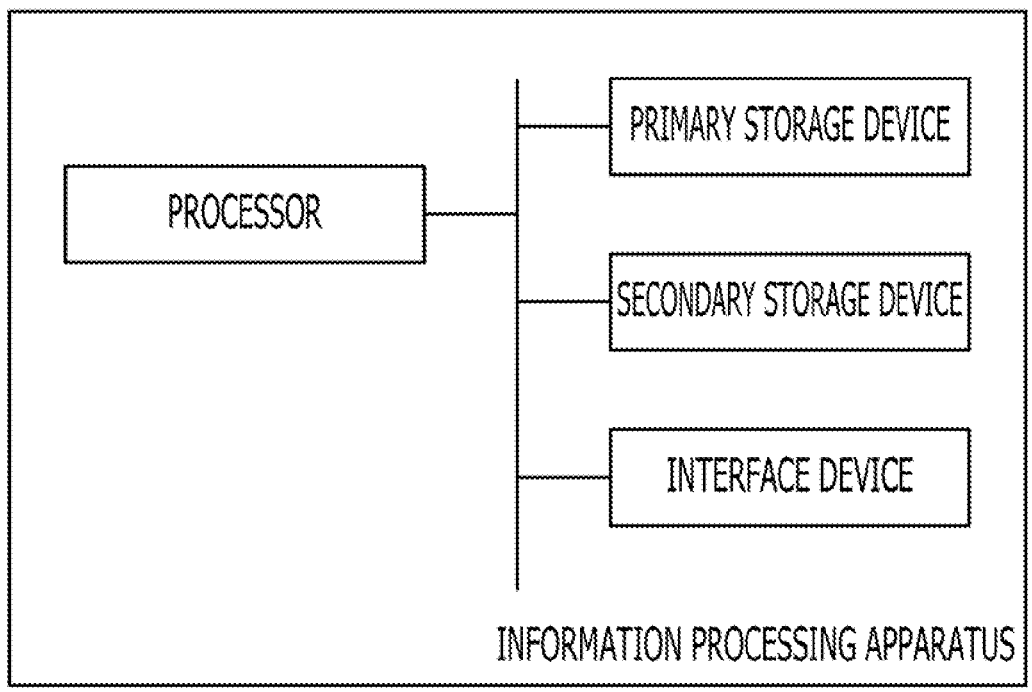
FIG. 16 illustrates an example of an information processing apparatus.

FIG. 16 illustrates an example of an information processing apparatus. In this example, the information processing apparatus is a computer that includes a processor, a primary storage device, a secondary storage device, and an interface device for peripheral devices. One example of the interface device is a communication interface device. The primary storage device and the secondary storage device are computer-readable recording media.

The processor can realize a function that meets an intended purpose by causing the processor to load a program, stored in a recording medium, into a work area in the primary storage device and to execute the program to control the peripheral device(s).

The processor may be, for example, a CPU (central processing unit) or a DSP (data signal processor). The primary storage device includes, for example, a RAM (random access memory) and a ROM (read only memory).

The secondary storage device is, for example, an EPROM (erasable programmable ROM) or a HDD (hard disk drive). The second storage device may also include a removable medium, i.e., a portable recording medium. Examples of the removable medium include a USB (universal serial bus) memory and a disk recording medium, such as a CD (compact disk) or a DVD (digital versatile disk).

Examples of the communication interface device include a LAN (local area network) interface board, a wireless communication circuit for wireless communication, and a device for optical communication.

The peripheral devices may include, in addition to the secondary storage device and the communication interface device, input devices, such as a keyboard and a pointing device, and output devices, such as a display device and a printer. The input devices may further include a video/image input device, such as a camera, and an audio input device, such as a microphone. The output devices may further include an audio output device, such as a speaker.

The computer that realizes the generator 100 may achieve the functions of the wavelet-type setter 110 and the wavelet-pulse generator 120 by causing the processor to load a program, stored in the secondary storage device, into the primary storage device and to execute the loaded program. The storage unit 125 is provided in a storage area in the primary storage device or the secondary storage device.

The computer that realizes the generator 200 may achieve the functions of the wavelet-type setter 210 and the wavelet-pulse generator 220 by causing the processor to load a program, stored in the secondary storage device, into the primary storage device and to execute the loaded program. The storage unit 225 is provided in a storage area in the primary storage device or the secondary storage device.

The computer that realizes the generator 300 may achieve the functions of the wavelet-type setter 310 and the wavelet-pulse generator 320 by causing the processor to load a program, stored in the secondary storage device, into the primary storage device and to execute the loaded program. The storage unit 325 is provided in a storage area in the primary storage device or the secondary storage device.

The computer that realizes the reception pulse analyzer 500 may achieve the functions of the wavelet analysis calculator 523 by causing the processor to load a program, stored in the secondary storage device, into the primary storage device and to execute the loaded program. The storage unit 525 is provided in a storage area in the primary storage device or the secondary storage device. The input/output interface unit 524 may be implemented as the interface device.

The computer that realizes the calculator 600 may achieve the functions of the propagation-time-difference determiner 610 by causing the processor to load a program, stored in the secondary storage device, into the primary storage device and to execute the loaded program. The storage unit 620 is provided in a storage area in the primary storage device or the secondary storage device.

First Embodiment

Figure 13:
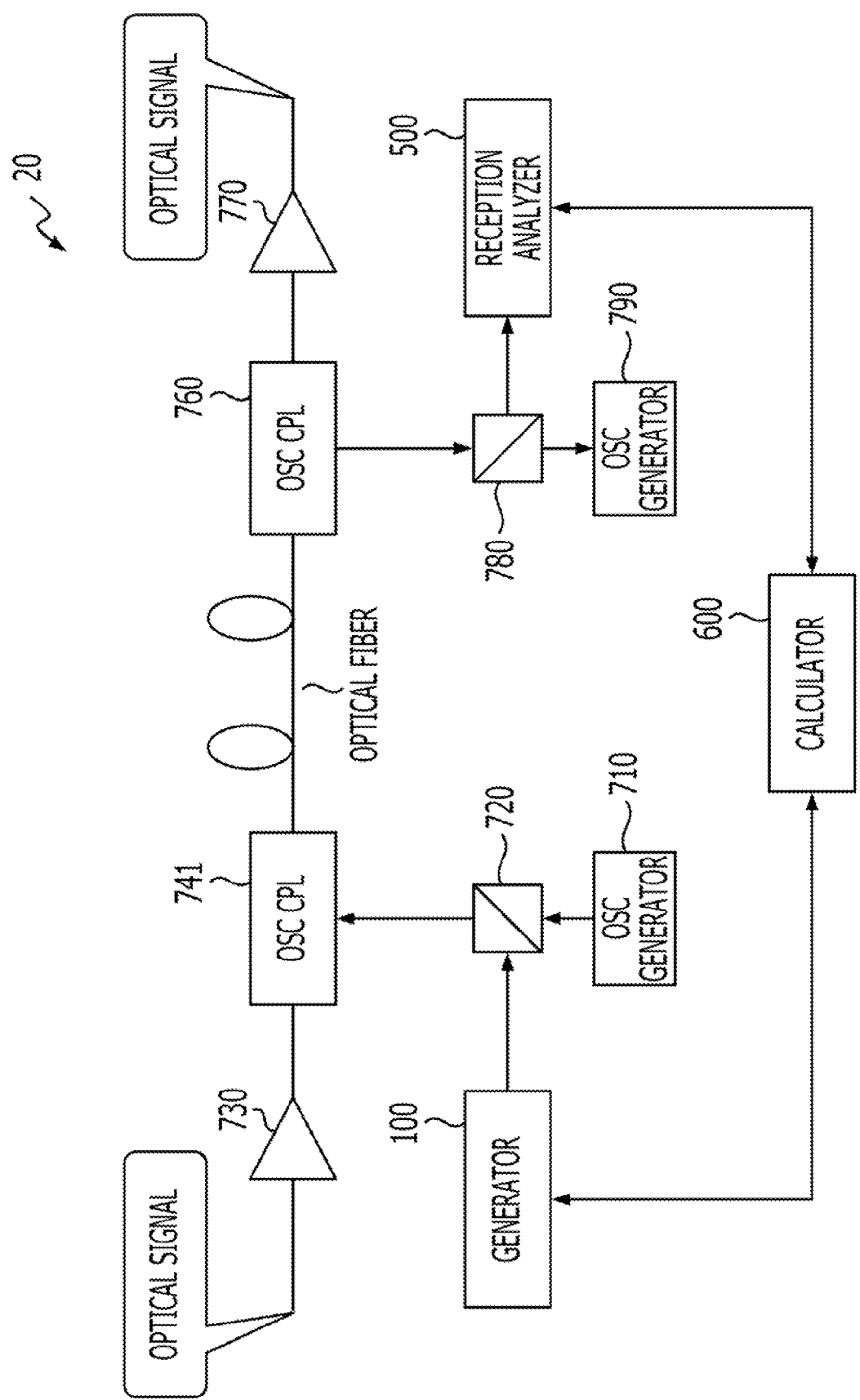
FIG. 13 illustrates an example of a dispersion measurement apparatus using an OSC port.

FIG. 13 illustrates an example of a dispersion measurement apparatus using an OSC (optical supervisory channel) port. A dispersion measurement apparatus 20 in FIG. 13 includes the generator 100, the reception pulse analyzer 500, the calculator 600, an OSC generator 710, a multiplexer 720, an amplifier 730, an OSC coupler (OSC CPL) 740, an OSC decoupler (OSC DCPL) 760, an amplifier 770, a demultiplexer 780, and an OSC generator 790. The generator may be replaced with the generator 200 or 300.

As described above, the generator 100 generates two optical signals with different wavelengths from each other and outputs the optical signals to the multiplexer 720.

The OSC generator 710 generates an OSC signal and outputs it to the multiplexer 720.

The multiplexer 720 combines the optical signals, including two optical pulses, generated by the generator 100 and the OSC signal generated by the OSC generator 710 and outputs the combined signal to the OSC coupler 740.

The amplifier 730 amplifies an optical signal and outputs the resulting signal to the OSC coupler 740.

The OSC coupler 740 couples the signal from the multiplexer 720 and the signal from the amplifier 730 and outputs the resulting signal to the optical fiber.

The OSC decoupler 760 decouples, from the optical signal, only the wavelength of the OSC and the wavelength of the light generated by the generator 100, and inputs the resulting signals to the demultiplexer 780. The OSC decoupler 760 also outputs the optical signal to the amplifier 770. The amplifier 770 amplifies the input optical signal and outputs the resulting signal.

The demultiplexer 780 separates the OSC signal and the optical signal output from the generator, outputs the OSC signal to the OSC generator 790, and outputs the optical signal to the reception pulse analyzer 500.

The OSC generator 790 receives the OSC signal separated by the demultiplexer 780.

As described above, the reception pulse analyzer 500 performs a wavelet transform on the received signal and outputs the resulting signal to the calculator 600.

As described above, the calculator 600 receives the information of the wavelengths of two optical signals from the generator 100, receives the wavelet-transform result from the reception pulse analyzer 500, and detects the time difference between the two optical signals to determine dispersion in the optical fiber.

The generator 100, the reception pulse analyzer 500, and the calculator 600 may be incorporated into an OSC port to allow the dispersion measurement apparatus 20 to monitor the state of the optical-fiber transmission path whenever useful and/or necessary.

Second Embodiment

A description will now be given of a second embodiment. The second embodiment is similar to the example described above. Thus, different points will be mainly described hereinafter.

A description in the second embodiment will be given in conjunction with an example of measurement of dispersion between arbitrary OADM (optical add-drop multiplexer) nodes of an arbitrary number of successive OADM nodes.

Figure 14:
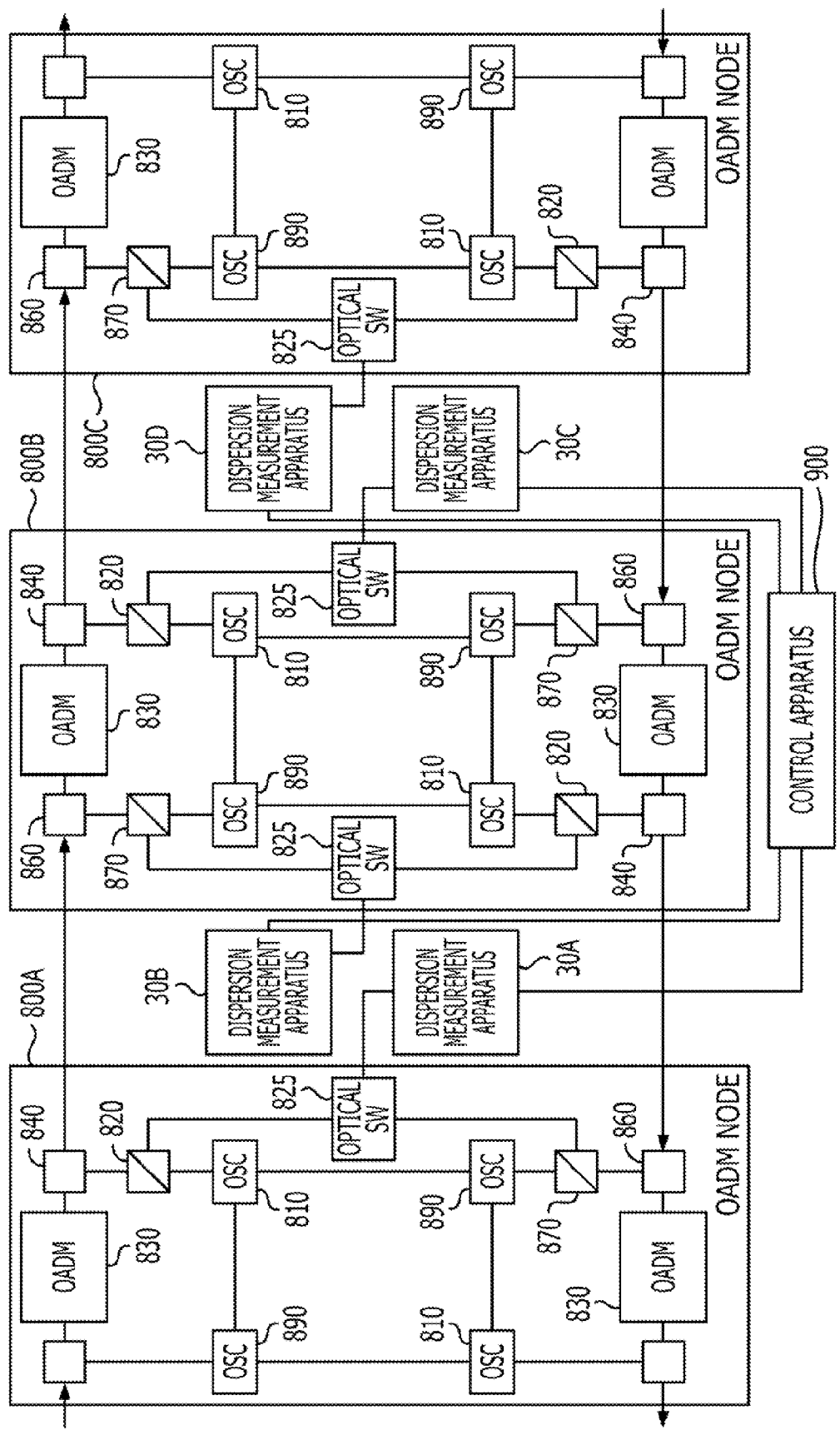
FIG. 14 illustrates an example of dispersion measurement apparatuses connected to OADM (optical add-drop multiplexer) nodes.

FIG. 14 illustrates an example of dispersion measurement apparatuses connected to OADM nodes. In the example of FIG. 14, OADM nodes 800A, 800B, and 800C are connected in series through optical fibers. Now, a description will be given of measurement of dispersion in the transmission path between the OADM node 800A and the OADM node 800B and dispersion in the transmission path between the OADM node 800A and the OADM node 800C.

A dispersion measurement apparatus 30A is connected to the OADM node 800A. Dispersion measurement apparatuses 30B and 30C are connected to the OADM node 800B. A dispersion measurement apparatus 30D is connected to the OADM node 800C. The dispersion measurement apparatuses 30A, 30B, 30C, and 30D are connected to a control apparatus 900.

The OADM node 800A includes OSC generators 810, a multiplexer 820, an optical switch (optical SW) 825, OADMs 830, an OSC coupler 840, an OSC decoupler 860, a demultiplexer 870, and OSC generators 890.

Each of the dispersion measurement apparatus 30A and the dispersion measurement apparatus 30D includes the generator 100 and the reception pulse analyzer 500. The generator 100 may be replaced with the generator 200 or 300. Each of the dispersion measurement apparatus 30B and the dispersion measurement apparatus 30C includes the reception pulse analyzer 500.

The optical switch 825 outputs a signal, received from the corresponding dispersion measurement apparatus, to the multiplexer 820 and outputs a signal, received from the OSC generator 890, to the corresponding dispersion measurement apparatus.

The OADM 830 performs multiplexing and demultiplexing, which correspond to a specific wavelength, on an optical signal in the optical fiber. The OADM 830 also amplifies the optical signal. The signal processed by the OADM 830 is output to the OSC coupler 840.

The control apparatus 900 controls each dispersion measurement apparatus. The control apparatus 900 includes the calculator 600.

Now, a description will be given of measurement of dispersion in the transmission path from the OADM node 800A to the OADM node 800B.

The dispersion measurement apparatus 30A generates two optical signals with different wavelengths from each other, as described above, and outputs the optical signals to the optical switch 825 in the OADM node 800A. The optical signals are input to the optical switch 825 and are then output to the OADM node 800B via the multiplexer 820 and the OSC coupler 840. The optical signals output from the OADM node 800A are then input to the OADM node 800B and are further input to the dispersion measurement apparatus 30B via an OSC decoupler 860, a demultiplexer 870, and an optical switch 825. The dispersion measurement apparatus 30B performs a wavelet transform on the received optical signals and outputs the resulting signals to the control apparatus 900. The control apparatus 900 detects a time difference between the two optical pulses on the basis of the wavelet-transform result from the dispersion measurement apparatus 30B. The control apparatus 900 obtains the information of the wavelengths of the transmitted two optical signals from the dispersion measurement apparatus 30A. The control apparatus 900 determines dispersion in the transmission path from the OADM node 800A to the OADM node 800B, on the basis of the wavelength of the two optical signals and the time difference obtained at the time of the reception.

Now, a description will be given of measurement of dispersion in the transmission path from the OADM node 800A to the OADM node 800C.

As described above, the dispersion measurement apparatus 30A generates two optical signals with different wavelengths from each other and outputs the optical signals to the optical switch 825 in the OADM node 800A. The optical signals are input to the optical switch 825 and are output to the OADM node 800B via the multiplexer 820 and the OSC coupler 840. The optical signals output from the OADM node 800A are input to the OADM node 800B and are further input to the OADM node 800C via the OSC decoupler 860, an OADM 830, and an OSC coupler 840. The optical signals output from the OADM node 800B are input to the OADM node 800C and are further input to the dispersion measurement apparatus 30D via an OSC decoupler 860, a demultiplexer 870, and an optical switch 825. The dispersion measurement apparatus 30D performs a wavelet transform on the received optical signals and outputs the resulting signals to the control apparatus 900. The control apparatus 900 detects a time difference between the two optical pulses on the basis of the wavelet-transform result from the dispersion measurement apparatus 30D. The control apparatus 900 obtains the information of the wavelengths of the transmitted two optical signals from the dispersion measurement apparatus 30A. The control apparatus 900 determines dispersion in the transmission path from the OADM node 800A to the OADM node 800C, on the basis of the wavelength of the two optical signals and the time difference obtained at the time of the reception.

The dispersion in the transmission path from the OADM node 800B to the OADM node 800C is determined by subtracting dispersion in the transmission path from the OADM node 800A to the OADM node 800C from dispersion in the transmission path from the OADM node 800A to the OADM node 800B.

Dispersion in the transmission path from the OADM node 800C to the OADM node 800A can also be measured in the same manner. In this case, as in the OADM node 800A and the OADM node 800C, the dispersion measurement apparatuses connected to the nodes located at opposite ends of a section used for dispersion measurement have the generators 100. As in the OADM node 800B, the dispersion measurement apparatus connected to the node located at the middle has the reception pulse analyzer 500.

Although the dispersion measurement for three successive OADM nodes has been described above, the number of OADM nodes is not limited to three. Thus, similarly, dispersion between four or more successive OADM nodes may also be determined.

According to the configuration in the second embodiment, dispersion between arbitrary OADM nodes of any number of successive OADM nodes can be measured.

Advantages of Embodiments

Figure 15:
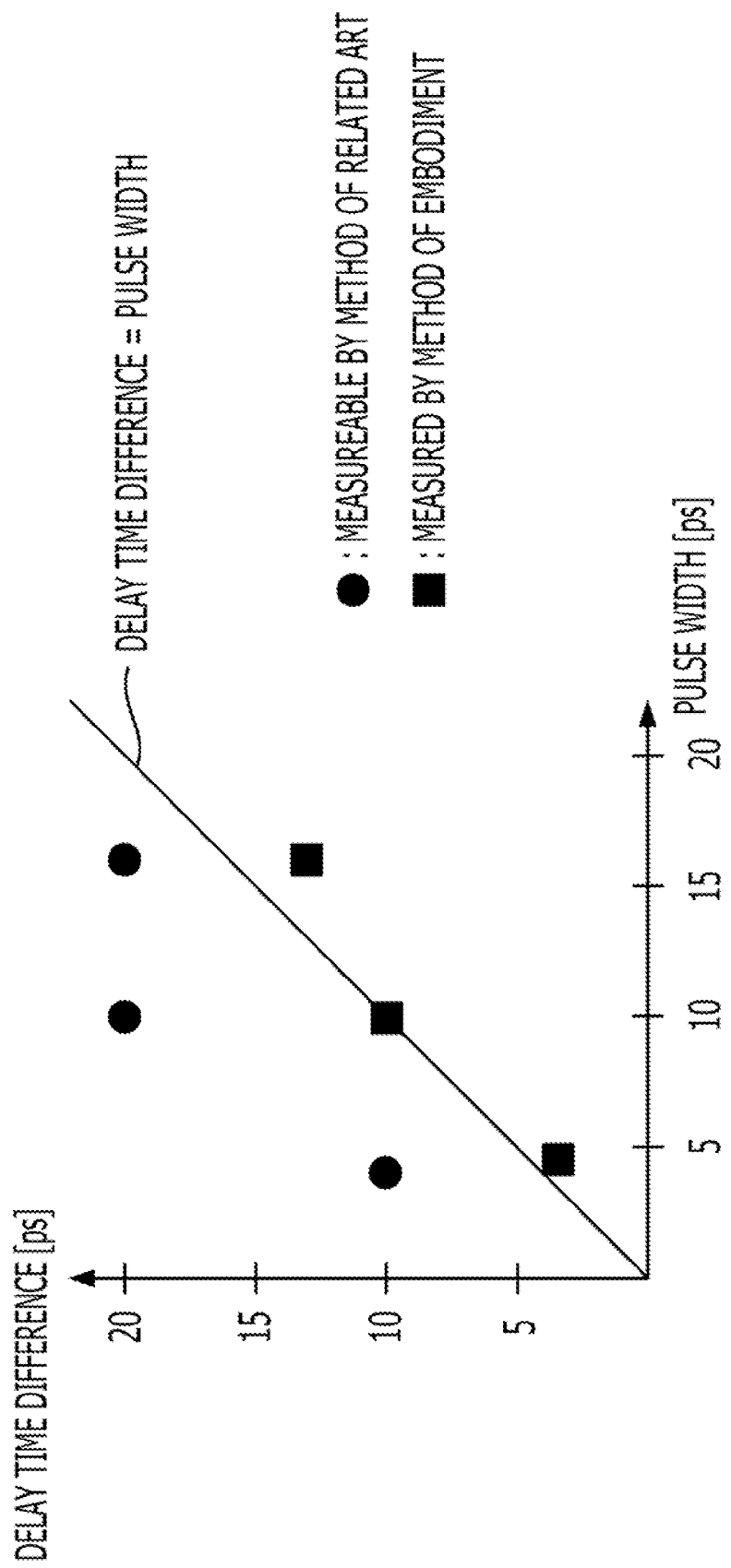
FIG. 15 is a graph illustrating a relationship between the pulse width of launched light and a measured propagation-time difference.

FIG. 15 is a graph illustrating a relationship between the pulse width of launched light and the measured propagation-time difference (i.e., the time difference between two pulses). In the graph in FIG. 15, points indicated by black circles represent propagation-time differences measurable using a method of related art. Points indicated by black squares represent propagation-time differences measured by the dispersion measurement apparatus 10 of the embodiment. When the time difference is smaller than the pulse width of launched light, the time difference between two optical pulses are undetectable in the related art. This is because, when the propagation-time difference is smaller than the pulse width, the waveforms of two optical pulses overlap each other. According to the dispersion measurement apparatus 10 of the embodiment, the use of a wavelet transform makes it possible to measure the time difference between two optical pulses, even when the time difference between the two optical pulses is smaller than the pulse width of light launched into the optical fiber. That is, according to the dispersion measurement apparatus 10, even when the time difference between received optical pulses is smaller than or substantially equal to the pulse width of the launched optical pulses, the time difference can be measured.

In the dispersion measurement apparatus 10, the optical pulses launched into the optical fiber are received and a wavelet transform is performed on the received optical pulses. On the basis of the result of the wavelet transform, the dispersion measurement apparatus 10 measures the time difference between the received pulses to determine the dispersion in the optical fiber.

According to the dispersion measurement apparatus 10, the shape of optical pulses launched into the optical transmission path has a wavelet and the receiving end performs a wavelet transform. Thus, according to the dispersion measurement apparatus 10, since the shape of the optical pulses launched has a wavelet and the wavelet transform is performed, an influence of noise generated by the optical amplifier or the like provided on the optical transmission path can be reduced, the measurement resolution for the propagation time difference can be enhanced, and the accuracy of the dispersion measurement can be improved.

According to the disclosed embodiments, it is possible to provide an apparatus that is capable of performing dispersion measurement with accuracy, even when the propagation-time difference is smaller than the optical pulse width of input light.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is clamed is:

1. A dispersion measurement apparatus comprising:
   a pulse generator to output optical pulses including an optical pulse with a first wavelength and an optical pulse with a second wavelength to an optical transmission path, the second wavelength being different from the first wavelength;
   a reception pulse analyzer including an optical receiver that receives the optical pulses output by the pulse generator, and an analyzer that performs a wavelet transform on an electrical pulse output through the reception performed by the optical receiver, the reception pulse analyzer being arranged opposite to the pulse generator by the optical transmission path; and
   a calculator to identify peaks within data obtained from the wavelet transform and to detect a time difference between the optical pulse with the first wavelength and the optical pulse with the second wavelength based on the identified peaks within the data from the wavelet transform, and to determine dispersion in the optical transmission path from said time difference.

2. The dispersion measurement apparatus according to claim 1, wherein
   the pulse generator simultaneously outputs, to the optical transmission path, an optical pulse with a first wavelength and with an amplitude based on a specified wavelet waveform and an optical pulse with a second wavelength and with an amplitude based on the specified wavelet waveform; and
   the analyzer performs the wavelet transform by using the specified wavelet waveform.

3. The dispersion measurement apparatus according to claim 2, wherein the pulse generator includes:
   a first light source that outputs an optical light with the first wavelength;
   a second light source that outputs an optical light with the second wavelength;
   a wavelet generator that generates the specified wavelet waveform;
   a first optical modulator that modulates the optical light output by the first light source, based on the wavelet waveform generated by the wavelet generator;
   a second optical modulator that modulates the optical light output by the second light source, based on the wavelet waveform generated by the wavelet generator; and
   a multiplexer that combines the optical light modulated by the first optical modulator and the optical light modulated by the second optical modulator and outputs a combined optical pulse to the optical transmission path.

4. The dispersion measurement apparatus according to claim 2, wherein the pulse generator includes:
   a first light source that outputs an optical light with the first wavelength;
   a second light source that outputs an optical light with the second wavelength;
   a multiplexer that combines the optical light output by the first light source and the optical light output by the second light source and outputs a combined optical pulse;

a wavelet generator that generates the specified wavelet waveform; and an optical modulator that modulates the combined optical pulse output by the multiplexer, based on the specified wavelet waveform generated by the wavelet generator, and outputs a modulated optical pulse to the optical transmission path.

5. The dispersion measurement apparatus according to claim 2, wherein the pulse generator includes:

a wavelet generator that generates the specified wavelet waveform;

a first light source that outputs an optical light with the first wavelength and with an amplitude based on the specified wavelet waveform generated by the wavelet generator;

a second light source that outputs an optical light with the second wavelength and with an amplitude based on the specified wavelet waveform generated by the wavelet generator; and a multiplexer that combines the optical light output by the first light source and the optical light output by the second light source and outputs a combined optical pulse to the optical transmission path.

6. The dispersion measurement apparatus according to claim 1, wherein a wavelength of the optical pulse output by the pulse generator is equal to a wavelength of the optical pulse received at the reception pulse analyzer.

* * * * *